United States Patent
Froseth et al.

(10) Patent No.: US 7,919,134 B2
(45) Date of Patent: *Apr. 5, 2011

(54) LAYERED CEREAL BARS CONTAINING INULIN AND THEIR METHODS OF MANUFACTURE

(75) Inventors: Barrie R. Froseth, Plymouth, MN (US); Dean F. Funk, Brooklyn Park, MN (US); Dena K. Strehlow, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/193,643

(22) Filed: Aug. 18, 2008

(65) Prior Publication Data

US 2008/0305215 A1 Dec. 11, 2008

Related U.S. Application Data

(63) Continuation of application No. 10/318,441, filed on Dec. 12, 2002, now Pat. No. 7,431,955, which is a continuation of application No. 09/667,209, filed on Sep. 21, 2000, now Pat. No. 6,592,915.

(60) Provisional application No. 60/156,729, filed on Sep. 30, 1999.

(51) Int. Cl.
  *A23L 1/10* (2006.01)
(52) U.S. Cl. ............ 426/568; 426/72; 426/74; 426/572; 426/618; 426/621; 426/583; 426/588; 426/656
(58) Field of Classification Search .................... 426/72, 426/74, 583, 621, 572, 588, 656, 658
See application file for complete search history.

(56) References Cited

U.S. PATENT DOCUMENTS

| | | | |
|---|---|---|---|
| 1,663,719 A | 3/1928 | Morley |
| 1,813,099 A | 7/1931 | Story |
| 1,890,697 A | 12/1932 | Scanlan |
| 1,924,826 A | 8/1933 | Anderson |
| 2,092,160 A | 9/1937 | Hawerlander |
| D119,054 S | 2/1940 | Tolmack |
| 2,190,949 A | 2/1940 | Plews |
| 2,310,463 A | 2/1943 | Russell |
| D193,170 S | 7/1962 | Porambo et al. |
| D212,070 S | 8/1968 | Hreschak |
| D213,034 S | 12/1968 | Slaybaugh |

(Continued)

FOREIGN PATENT DOCUMENTS

CA 2384847 4/2001

(Continued)

OTHER PUBLICATIONS

*Congressional Club Cook Book, Eighth Edition*, Recipe for "Cereal Cookies", The Congressional Club, Washington, D.C.,(1970), p. 371.

(Continued)

*Primary Examiner* — Helen F Pratt
(74) *Attorney, Agent, or Firm* — John A. O'Toole

(57) ABSTRACT

A non-cooked cereal bar containing inulin and having a total nutrient level equal to or greater than the nutrient level of a single serving of RTE cereal with milk is described. In one embodiment, the cereal layer is comprised of a cereal composition containing RTE cereal, high-protein rice pieces and TVP in a ratio of about 2:1:1. In another embodiment, a method for manufacturing a non-cooked cereal bar containing inulin is described.

37 Claims, 10 Drawing Sheets

U.S. PATENT DOCUMENTS

| | | | |
|---|---|---|---|
| 3,821,443 | A | 6/1974 | Halladay et al. |
| 3,903,308 | A | 9/1975 | Ode |
| 3,917,861 | A | 11/1975 | Viera et al. |
| 4,038,423 | A | 7/1977 | Hayward et al. |
| 4,055,669 | A | 10/1977 | Kelly et al. |
| D254,936 | S | 5/1980 | Saunders |
| D296,377 | S | 6/1988 | Skiver et al. |
| D315,241 | S | 3/1991 | Constance |
| 5,026,689 | A | 6/1991 | Ringe et al. |
| D321,580 | S | 11/1991 | Jones |
| 5,091,201 | A | 2/1992 | Murata et al. |
| D334,274 | S | 3/1993 | Creighton et al. |
| D340,568 | S | 10/1993 | Lane |
| 5,250,308 | A | 10/1993 | Alexander et al. |
| 5,273,771 | A | 12/1993 | Rapaille et al. |
| D347,515 | S | 6/1994 | Creighton et al. |
| D354,386 | S | 1/1995 | Smith et al. |
| D360,969 | S | 8/1995 | Uecker et al. |
| 5,612,074 | A | 3/1997 | Leach |
| D384,785 | S | 10/1997 | Laughlin |
| 5,709,902 | A | 1/1998 | Bartolomei et al. |
| 5,804,235 | A | 9/1998 | Altschul |
| 5,827,564 | A | 10/1998 | Bodkins, Sr. |
| D408,960 | S | 5/1999 | Kauffman et al. |
| D409,355 | S | 5/1999 | Citarella et al. |
| 5,919,503 | A | 7/1999 | Leusner |
| 5,935,613 | A | 8/1999 | Benham et al. |
| D422,774 | S | 4/2000 | Hersh |
| 6,048,555 | A | 4/2000 | Kamper et al. |
| 6,149,965 | A | 11/2000 | van Lengerich et al. |
| 6,242,033 | B1 | 6/2001 | Sander |
| 6,432,460 | B1 | 8/2002 | Zietlow et al. |
| D462,501 | S | 9/2002 | Allen et al. |
| D478,703 | S | 8/2003 | Allen et al. |
| D478,704 | S | 8/2003 | Funk et al. |
| D518,941 | S | 4/2006 | Allen et al. |
| 7,097,870 | B2 | 8/2006 | Funk et al. |
| 7,431,955 | B2 | 10/2008 | Froseth et al. |
| 2003/0134010 | A1 | 7/2003 | Krysiak et al. |
| 2003/0185961 | A1 | 10/2003 | Sault et al. |

FOREIGN PATENT DOCUMENTS

| | | |
|---|---|---|
| EP | 0178074 A1 | 4/1986 |
| EP | 0325479 A2 | 7/1989 |

OTHER PUBLICATIONS

"U.S. Appl. No. 09/667,209, Advisory Action mailed Aug. 16, 2002", 2 pgs.

"U.S. Appl. No. 09/667,209, Final Office Action mailed May 8, 2002", 10 pgs.

"U.S. Appl. No. 09/667,209, Non-Final Office Action mailed Oct. 9, 2002", 7 pgs.

"U.S. Appl. No. 09/667,209, Notice of Allowance mailed Jan. 31, 2003", 4 pgs.

"U.S. Appl. No. 09/667,209, Preliminary Amendment filed Sep. 27, 2001", 6 pgs.

"U.S. Appl. No. 09/667,209, Response filed Dec. 9, 2002 Non-Final Office Action mailed Oct. 9, 2002", 5 pgs.

"U.S. Appl. No. 09/667,209, Response filed Jul. 30, 2002 to Final Office Action mailed May 8, 2002", 20 pgs.

"U.S. Appl. No. 10/318,441 Amendment and Response filed Mar. 20, 2008 to Non-Final Office Action mailed Dec. 26, 2007", 7 pgs.

"U.S. Appl. No. 10/318,441 Notice of Allowance mailed May 20, 2008", 4 pgs.

"U.S. Appl. No. 10/318,441 Supplemental Notice of Allowability mailed Jun. 6, 2008", 6 pgs.

"U.S. Appl. No. 10/318,441 Non-Final Office Action Mailed Dec. 26, 2007", 19 pgs.

"U.S. Appl. No. 10/413,450, Non-Final Office Action mailed Jun. 21, 2005", 10 pgs.

"U.S. Appl. No. 10/413,450, Notice of Allowance mailed Dec. 19, 2005", 4 pgs.

U.S. Appl. No. 10/413,450, Response filed Sep. 21, 2005 Non-Final Office Action mailed Jun. 21, 2005, 20 pgs.

"U.S. Appl. No. 29/111,589, Final Office Action mailed Sep. 1, 2001", 10 pgs.

"U.S. Appl. No. 29/111,589, Final Office Action mailed Sep. 5, 2001", 8 pgs.

"U.S. Appl. No. 29/111,589, Notice of Allowance mailed Jan. 15, 2002", 5 pgs.

"U.S. Appl. No. 29/111,589, Response filed Nov. 8, 2001 Final Office Action mailed Sep. 11, 2001", 5 pgs.

"U.S. Appl. No. 29/111,591, Final Office Action mailed Jun. 5, 2001", 8 pgs.

"U.S. Appl. No. 29/111,591, Final Office Action mailed Sep. 11, 2001", 9 pgs.

"U.S. Appl. No. 29/111,592, Final Office Action mailed Jun. 11, 2001", 7 pgs.

"U.S. Appl. No. 29/111,592, Final Office Action mailed Aug. 29, 2000", 4 pgs.

"U.S. Appl. No. 29/111,592, Final Office Action mailed Sep. 17, 2001", 9 pgs.

"U.S. Appl. No. 29/111,592, Notice of Allowance mailed Jan. 15, 2002", 7 pgs.

"U.S. Appl. No. 29/111,592, Preliminary Amendment filed Nov. 15, 2000", 4 pgs.

"U.S. Appl. No. 29/111,592, Response filed Nov. 8, 2001 Final Office Action mailed Sep. 11, 2001", 5 pgs.

"U.S. Appl. No. 29/111,593, Final Office Action mailed Jun. 19, 2001", 7 pgs.

"U.S. Appl. No. 29/111,593, Final Office Action mailed Sep. 11, 2001", 7 pgs.

"U.S. Appl. No. 29/111,593, Notice of Allowance mailed Jan. 15, 2002", 4 pgs.

"U.S. Appl. No. 29/111,594, Final Office Action mailed Jul. 31, 2001", 10 pgs.

"U.S. Appl. No. 29/111,594, Final Office Action mailed Aug. 15, 2000", 5 pgs.

"U.S. Appl. No. 29/111,594, Notice of Allowance mailed May 28, 2002", 4 pgs.

"U.S. Appl. No. 29/111,594, Preliminary Amendment mailed Nov. 15, 2000", 5 pgs.

"U.S. Appl. No. 29/111,595, Final Office Action mailed Mar. 11, 2001", 8 pgs.

"U.S. Appl. No. 29/111,595, Notice of Allowability mailed Jan. 15, 2002", 3 pgs.

"U.S. Appl. No. 29/111,595, Response filed Nov. 8, 2001 Final Office Action mailed Sep. 11, 2001", 5 pgs.

"U.S. Appl. No. 29/153,776, Notice of Allowance mailed May 5, 2003", 2 pgs.

"U.S. Appl. No. 29/153,776, Response filed Dec. 5, 2002 to Restriction Requirement mailed Nov. 5, 2002", 2 pgs.

"U.S. Appl. No. 29/153,776, Restriction Requirement mailed Nov. 5, 2002", 6 pgs.

"U.S. Appl. No. 29/156,072, Notice of Allowance mailed May 5, 2003", 6 pgs.

"U.S. Appl. No. 29/156,072, Response filed Dec. 5, 2002 Restriction Requirement mailed Nov. 5, 2002", 2 pgs.

"U.S. Appl. No. 29/156,072, Restriction Requirement mailed Nov. 5, 2002", 6 pgs.

"U.S. Appl. No. 29/183,322, Final Office Action mailed Jan. 27, 2004", 6 pgs.

"U.S. Appl. No. 29/183,322, Non-Final Office Action mailed Aug. 28, 2003", 5 pgs.

"U.S. Appl. No. 29/183,322, Notice of Allowance mailed May 19, 2004", 2 pgs.

"U.S. Appl. No. 29/183,322, Response filed Nov. 24, 2003 Non-Final Office Action mailed Aug. 28, 2003", 9 pgs.

"U.S. Appl. No. 29/183,322, Response filed Mar. 29, 2004 Final Office Action mailed Jan. 27, 2004", 7 pgs.

"U.S. Appl. No. 29/200,994, Final Office Action mailed Dec. 9, 2004", 5 pgs.

"U.S. Appl. No. 29/200,994, Notice of Allowance mailed Apr. 12, 2005", 3 pgs.

"U.S. Appl. No. 29/200,994, Response filed Mar. 9, 2005 Final Office Action mailed Dec. 9, 2004", 4 pgs.

"Canadian Application Serial No. 2464203, Office Action mailed Jun. 17, 2008", 3 pgs.
"Clif raises the bar", *Food Processing*, Advertisement,(May 1999),1 page.
"Crunchy Chocolate Bars", *In: 1001 Cookie Recipes*, Gillespie, G. R., Editor, Workman Publishing Company, New York, N.Y.,(1995),p. 181.
"Packaging Flat for Balance", *Bio-Foods*, (1994),2 pages.
"Packaging Flat for Balance Outdoor", *Balance Bar*, (Jul. 1999),1 page.
"Packaging Flat for Boost", *Mead Johnson*, (Feb. 1998),1 page.
"Packaging Flat for Breakfast Bars", *Hain Pure Foods*, (Jun. 1997),2 pages.
"Packaging Flat for Breakfast Squares", *General Mills*, (Apr. 1970),2 pages.
"Packaging Flat for Breakthru Nutrition Bar", *Glenn Foods*, (Mar. 1998),1 page.
"Packaging Flat for Cap'n Crunch Treats", *Quaker*, (Mar. 1997),2 pages.
"Packaging Flat for Carnation Instant Breakfast Bars", *Nestle*, (prior to 1997),2 pages.
"Packaging Flat for Chewy Granola Bars", *Quaker*, (Jan. 1990),2 pages.
"Packaging Flat for Clif Bar", *Kali's Sports Naturals*, (Sep. 1991),1 page.
"Packaging Flat for Clif Kicks Bar", Kali's Sports Naturals,(Jul. 1997),2 pages.
"Packaging Flat for Coco Pops Cereal & Milk Bars", *Kellogg's*, (1999),3 pages.
"Packaging Flat for Corny Snack Bars", *Schwartau*, (Nov. 1999),2 pages.
"Packaging Flat for Crunchy Nut Corn Flake Cereal Bars", *Kellogg's*, Australia,(Feb. 1998),2 pages.
"Packaging Flat for Diet Fuel", *Twin Lab*, (Jul. 1998),1 page.
"Packaging Flat for Edge Bar", *Nutritional N-Er-G Products*, (Jul. 1991),2 pages.
"Packaging Flat for Frosties Cereal & Milk Bars", *Kellogg's*, 1 page.
"Packaging Flat for Fruit and Oatmeal", *Quaker*, (May 1997),2 pages.
"Packaging Flat for Glenny's Chocolate Crunch", *Glenn Foods*, (Jan. 1996),1 page.
"Packaging Flat for Golden Grahams Treats", *General Mills*, (Oct. 1996),3 pages.
"Packaging Flat for Golf Pro Nutrition Bar", (Nov. 1993),1 page.
"Packaging Flat for Healthy Cheesecake Bars", *Health Valley*, (Jan. 1995),1 page.
"Packaging Flat for Hoffman's Energy Bar", *York Barbell*, (Nov. 1997),1 page.
"Packaging Flat for Just Right Cereal Bars (Australia)", *Kellogg's*, (Feb. 1998),2 pages.
"Packaging Flat for Kudos", *Mars*, (Oct. 1989),2 pages.
"Packaging Flat for Kushi Cuisine Crispy Rice Bars", *Kushi Macrobiotics*, (Jan. 1996),1 page.
"Packaging Flat for Luna Chocolate Pecan Pie", *Clifbar*, (Mar. 1999),1 page.
"Packaging Flat for Meal Pack", *Bear Valley Foods*, (Sep. 1980),1 page.
"Packaging Flat for MET-Rx Food Bar", *MET-Rx Substrate Technology*, (Sep. 1992),1 page.
"Packaging Flat for Nature's Choice Natural Delight Yogurt Dipped Desserts", *Barbara's Bakery*, (Jul. 1999) ,2 pages.
"Packaging Flat for Nesquik Biscuit Sticks", *Nestle*, (Sep. 1999),2 pages.
"Packaging Flat for New Yorker Breakfast Bar", *Renshaw Scott Ltd.* (England), (Jul. 1999),2 pages.
"Packaging Flat for Nutri Grain", *Kellogg's*, (Mar. 1991),2 pages.
"Packaging Flat for Nutri Grain Twists", *Kellogg's*, (Oct. 1998),2 pages.
"Packaging Flat for Nutri-Grain Twists", *Kellogg's*, Forest Fruits and Yogurt,(1998),2 pages.
"Packaging Flat for Oatmeal Creme Bar Chewy Whole Grain Snack Bar", *Starbucks*, (Dec. 1998),1 page.
"Packaging Flat for Oatmeal Crisp Fruit'n Cereal Bars", *General Mills*, 2 Pages.
"Packaging Flat for Oreo Granola Bars", *Nabisco*, (Mar. 1994),2 pages.
"Packaging Flat for Power Bar", *Powerfood*, (Jun. 1991),1 page.
"Packaging Flat for Pro Tour", *Barbara's Bakery*, (Jan. 1996),1 page.
"Packaging Flat for Prozone", *NutriBiotic*, (Aug. 1996),1 page.
"Packaging Flat for Rice Cake Sandwich Choco and Cheese", *Granco*, (Jul. 1999),4 pages.
"Packaging Flat for Rice Krispies Treats Chocolate Chip", *Kellogg's*, (May 1997),2 pages.
"Packaging Flat for Rice Krispies Treats Cocoa Crispy Marshmallow Squares", *Kellogg's*, (Apr. 1999),2 pages.
"Packaging Flat for Rice Krispies Treats Crispy Marshmallow Squares", *Kellogg's*, (1998),2 pages.
"Packaging Flat for Rice Krispies Treats Crispy Marshmallow Squares", *Kellogg's*, (Apr. 1999),4 pages.
"Packaging Flat for Rice Krispies Treats Peanut Butter Chocolate", *Kellogg's*, (Apr. 1999),3 pages.
"Packaging Flat for Shaqbar", *Amway*, (Oct. 1995),2 pages.
"Packaging Flat for Smack's Cereal", *Kellogg's*, England,(1999),1 page.
"Packaging Flat for Smacks Cereal and Milk Bars", *Kellogg's*, England,(1999),1 page.
"Packaging Flat for Snackwell's Cereal Bars", *Nabisco*, (Jun. 1996),1 page.
"Packaging Flat for Snackwell's Hearty Fruit'n Grain Cereal Bars", *Nabisco*, (prior to 1999),2 pages.
"Packaging Flat for Source Bar", *Empowered Athletics*, (Aug. 1996),1 page.
"Packaging Flat for Stoker Energy Bar", *BTU Stoker*, (May 1994),1 page.
"Packaging Flat for Sustain Cereal Bars (Australia)", *Kellogg's*, (Feb. 1998),2 pages.
"Packaging Flat for Think Interactive Bar", *Personal Health Development*, (Jan. 1996),4 pages.
"Packaging Flat for Trek Barr", *Mountain Biscuit*, (Feb. 1997),1 page.
"Packaging Flat for Whole Grain Bars", *Earth's Best*, (May 1996),2 pages.
"Packaging Flat for Zone Perfect", *Eicotech Corp.*, (1999),2 pages.
"Packaging Flat Smacks Cereal and Milk Bars", *Kellogg's*, England,(1999),1 page.
"Power Bark for Fido", *Food Processing*, Advertisement,(May 1999),1 page.
"Raspberry Oatmeal Bars", *Great American Favorite Brand Name Cookbook*, Illinois, Publication Int. Ltd,(1993),433.
Rombauer, I. S., et al., *Joy of Cooking*, The Bobbs-Merrill Company, Inc., New York,(1975),p. 724-725, 791.
"Canadian Application No. 2464203, Office Action Mailed Mar. 11, 2010", 4 pgs.
"Canadian Application No. 2464203, Office Action Response Filed Sep. 13, 2010", 6 pgs.

LAYERED CEREAL BARS CONTAINING INULIN AND THEIR METHODS OF MANUFACTURE

RELATED APPLICATIONS

This application is a continuation of U.S. patent application Ser. No. 10/318,441 filed Dec. 12, 2002, now U.S. Pat. No. 7,431,955 which is a continuation application of U.S. patent application Ser. No. 09/667,209, filed Sep. 21, 2000, now U.S. Pat. No. 6,592,915 which claims the benefit under 35 U.S.C. 119(e) of U.S. Provisional Application Ser. No. 60/156,729 filed on Sep. 30, 1999, the contents of which are incorporated herein by reference in their entirety.

FIELD

This invention relates to cereal bars, and in particular this invention relates to layered cereal bars, and the method and apparatus for their manufacture.

BACKGROUND

There have been many efforts in the food industry to develop meal substitutes, particularly breakfast substitutes, for consumers who do not have the time or desire to consume a conventional meal. To serve as a convenient meal substitute, a product should be a portable ready-to-eat food product that requires no cooking, no application of additional ingredients, and so forth. Ideally a meal substitute does not require the use of utensils such that it can be eaten in nearly any location at any time, including while driving, riding on a train, walking, and so forth.

Some of the most popular meal substitutes are substantially nonperishable hand-to-mouth food products that are packaged in disposable packaging materials. Many such products come in the form of a hand held food bar. However, food bars are not necessarily nutritionally complete. Specifically, many food bars lack adequate protein, vitamins, minerals, fiber and so forth, to accurately be considered a "meal substitute."

Further, many of these products are difficult to handle, either because they are too dry or too moist. Bars that are too dry fall apart easily, producing unwanted crumbs. Bars that are too moist become excessively sticky and messy. Additionally, the organoleptic properties of many of these bars are quite poor. In some instances, this is due to a high level of soy proteins, which can cause an undesirable off-flavor, if not otherwise masked.

It is also important that food, particularly meal substitutes, have an appealing appearance so that the entire eating experience is a pleasant one. Many of the meal substitutes on the market today, however, have been processed to such an extent that they bear little or no resemblance to their original state.

Thus, what is needed is a portable food product that has improved nutritional and organoleptic characteristics, yet maintains an appealing appearance.

SUMMARY

A layered cereal bar with at least two cereal layers having identifiable ready-to-eat (RTE) cereal pieces and at least one visible filling layer in between the at least two cereal layers is described. In one embodiment, the cereal bar is a non-cooked cereal bar having a total nutrient level equal to or greater than the nutrient level of a single serving of boxed cereal with milk. In another embodiment, the cereal bar has about six (6) grams (g) of protein.

In one embodiment, the filling layer is a confectionery center that is high in milk content, but possesses a relatively low water activity. In another embodiment, the filling layer is a compound coating. In another embodiment, the filling layer is a visible milk filling layer comprised of milk powder, sweeteners and fat in a ratio of about 1:2:1.4. In yet another embodiment, the filling layer comprises about 20%, by weight, of the cereal bar.

In one embodiment, the cereal layer is comprised of a cereal composition containing RTE cereal, high-protein rice pieces and texturized vegetable protein (TVP) in a ratio of about 2:1:1. The cereal layer further comprises a binder to hold the cereal composition together. In one embodiment, the binder is a complex carbohydrate binder made from soy protein, fat, sweeteners, water and gelatin. In another embodiment, flavorings, colorings and macronutrients in the form of a vitamin/mineral blend are added to the binder. In a particular embodiment, tricalcium phosphate is added to provide calcium fortification. In another embodiment, the RTE cereal is fortified with added protein and the TVP and/or rice pieces are not used in the cereal composition. In one embodiment, the density of the cereal composition increases by about 1.5 to two (2) times after being compressed into layers.

In one embodiment, components of the layered cereal bar are comprised of about 20% cereal, 40% binder, 10% TVP, 10% rice and 20% milk filling, by weight, although the invention is not so limited. Within acceptable ranges, the ratios of the various components can be altered, depending on a particular application.

In another embodiment, a method for manufacturing a layered cereal bar having a visible filling layer is described. The steps include mixing a binder with a cereal composition having identifiable cereal pieces to form an amorphous mass, compressing the amorphous mass into a first layer and a second layer, applying a filling layer on the first layer, combining the first layer and filling layer with the second layer, and pressing the first layer, filling layer and second layer together to form pressed layers, wherein the pressed layers are cut into individual cereal bars having identifiable cereal pieces, each cereal bar having a total nutrient level equal to or greater than the nutrient level of a single serving of ready-to-eat cereal and milk.

In another embodiment, various devices for manufacturing a layered cereal bar are described. Such devices include beltless compressing rollers that operate in series to combine a mixture comprising the cereal composition and binder. The rollers rotate in the same direction as a conveyor below, although at a faster speed. By operating the rollers in this manner, the surface of the product is more polished, giving it a better, less rough appearance. Compression is also improved with reduced breakage of cereal pieces. The rollers have the further advantage of staying cleaner during operation.

In one embodiment, the protein in the layered cereal bar of the present invention is derived from grain protein in the cereal components, soy protein in the form of soy protein isolates and texturized vegetable protein, and milk protein in the form of whole and non-fat milk powder. In addition to providing approximately the same quantity of protein as a bowl of cereal and milk, these three diverse sources provide a high quality protein due to the inherent advantage of complementary amino acids, particularly from the soy and grain sources.

The layered cereal bar of the present invention further has excellent storage stability properties. With a water activity (Aw) in the range of about 0.35 to 0.55, the finished product has a crisp texture that does not crystallize and dry out, yet does not become soft and stale. Use of butylated hydroxy toluene (BHT) also limits lipid oxidation that is known to cause flavor degradation. In some embodiments, cereal formulas that are more stable due to relatively low levels of highly unsaturated fats are used. In other embodiments, modifications are made to a RTE cereal base to reduce certain components, such as oats, known to have shorter shelf lives. Use of a carbohydrate binder further slows moisture uptake, which can cause textural defects.

The layered cereal bar is completely portable, yet provides the calcium, vitamins, minerals and protein of a bowl of cereal and milk. The cereal bar can essentially be eaten at anytime, in any place. The bar has consumer appeal due to the presence of a defined milk layer. The milk layer has a white, creamy appearance, a smooth, lubricious texture, as well as a clean, dairy flavor. The layered cereal bar is substantially larger than conventional food bars, weighing about 40 to 50 g. The layered cereal bar contains virtually no cholesterol and is low in sodium. The additional benefits of relatively high levels of protein, fiber, and complex carbohydrates results in a product that is more than just a light treat or snack, as it is relatively satiating, providing energy lasting up to several hours. Such nutritional characteristics differentiate this product from other types of known portable grain-based snacks.

DETAILED DESCRIPTION

Figure 1:
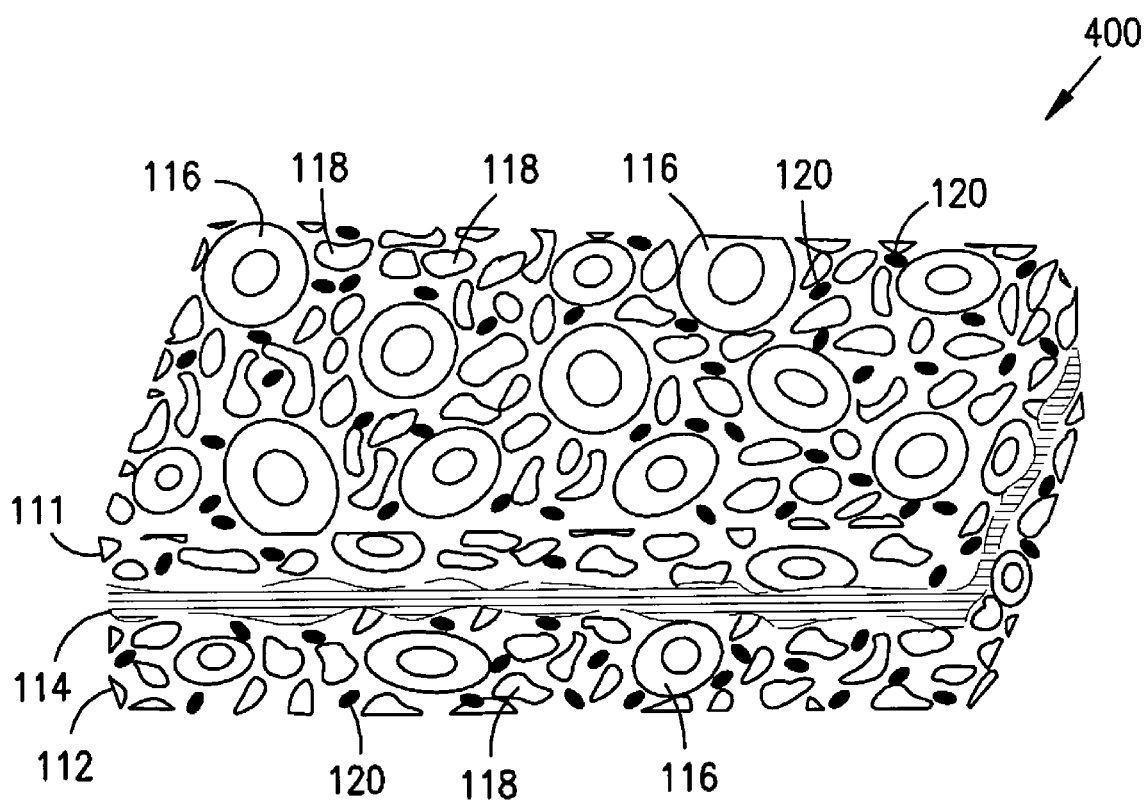
FIG. 1 is a schematic drawing of a layered cereal bar having two outer cereal layers and a visible inner filling layer in one embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents.

Various terms used throughout the description are defined first, followed by a discussion of various layered cereal bar embodiments, including information on their compositions. The process and apparatus for making the layered cereal bars is described next, followed by a brief conclusion highlighting some of the advantages of the various embodiments of the invention.

Introductory Definitions

As used herein, the term "additive" is intended to encompass any type of food ingredient added to the food product at any time during manufacturing. A "topping" is one type of additive which typically stays on "top" of the end product, although a "topping" can also be applied as a "coating" such that it adheres to some or all of the end product, with or without the assistance of a carrier substance. Liquids in any form are also considered to be additives. Embodiments discussing use of "toppings" can also include the use of any type of "additive." Additives also include non-nutritive (non-carbohydrate) sweeteners (such as aspartame, acesulfame K, and saccharin) as well as carbohydrate-based sweeteners, and any other "carbohydrate" as defined below. Additives further include acids, bases, salts, buffering systems, chelating agents, antioxidants, antimicrobial agents, gases/propellants, and so forth. Additives further include nutrient and health additives such as vitamins, minerals, encapsulated biologically active components, nutraceuticals (defined below), dietary supplements, anti-oxidants, fibers, inulin, calcium carbonate, probiotic bacteria sprinkles (e.g., lactobacillus or acidophilus), energy additives, protein powders, powdered milk fractions, protein or satiety additives, herbs, aromatic substances, and other similar health-enhancing additives.

The term "binder," when used without qualification herein refers to a syrup composition that essentially acts as a "glue" for combining relatively dry ingredients. The syrup composition can be a gelatin matrix comprised of gelatin, water, fat, syrup and sugars. When mixed with other ingredients, such as soy products, the binder can also be a source of protein. A binder can also contain vitamins, minerals and macronutrients, flavorings and colorings.

The term "carbohydrate" refers to any organic compound (and its derivatives and analogs) containing carbon, hydrogen, and oxygen as well as a saccharose group, as represented by the formula:

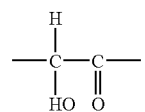

As such, carbohydrates include mono-, di-, oligo-, and polysaccharides and their derivatives (such as sugar alcohols and sugar esters). Carbohydrates may impart sweetness (as in the case of sugar) or non-sweetness (as in the case of starch). Examples of sweet and non-sweet carbohydrates include fructose, sucrose, lactose, maltose, galactose, xylose, dextrose, maltose, trehalose, raffinose, stachyose, corn syrups, honey, molasses, malt syrups, corn syrup solids, maltodextrins, starches, pectins, gums, carrageenan, and inulin.

The term "color" or "coloring agent" as used herein refers to natural or uncertified colors from natural sources or certified colors for the effect of color. In one embodiment, the colors include dyes, certified aluminum lakes or colors derived from a natural source. Coloring agents may also be water-based or oil-based or dry. Coloring agents may be primary colors, blends of colors or discrete mixtures of colors, such as confetti.

The term "compound coating" refers to a coating containing any fat other than cocoa butter. This is unlike "chocolate" which must contain cocoa butter.

The term "density" when used without qualification herein refers to "bulk density" of a component or composition.

The term "edible particulate" as used herein refers to edible flakes, grits and meal of corn, oats, rice, potatoes and other tubers, psyllium, wheat, sugars, soy, and combinations of these materials.

The term "fat" as used herein is synonymous with the term "lipid" and refers to substantially all fats and fat substitutes, including any animal or vegetable fat in solid or liquid form.

The term "flavor" or "flavoring" as used herein refers to an organoleptic agent in the form of an emulsion, concentrate, aqueous- or oil-soluble liquid or a dry powder, as well as any type of chunky piece or pieces that may be added to a mixture at any time in the process. Flavorings can also be considered additives and can include nuts, fresh fruits, dried fruits, fruit products, candies, marshmallows, "marbits," chocolates and chocolate products, and so forth. Flavorings further include any fruit flavors such as berry flavors, apple, cherry, plum, raisin, banana, pear, peach, figs, dates and so on. Flavorings may also include fats, salts, honeys, cheeses, frosting, powdered food products, sugar, sugar substitutes, gelatins and spices. Flavorings may also include colorings as well as any nut flavors as well as any sweet flavors such as chocolate, vanilla, caramel, butterscotch, lemon, malt, cinnamon, graham, coconut flavors, mint, and so on. Flavorings additionally include any savory flavors such as all meat, game, fowl, fish, dairy, barbecue, smoke, pepper, spicy and vegetable flavors.

The term "nutraceutical" as used herein refers to edible materials having, or believed to have, medicinal effects. Nutraceuticals include the tocopherols, B vitamins, ginseng and other herbs, wheat grass and barley grass and extracts of the grasses, soy-based estrogen analogs, minerals and so on.

The term "soy flour" as used herein refers to defatted soy flour and soy flour with fat. Oil content in soy flour ranges from less than one percent for defatted soy flour to 18 to 20 percent for full fat soy flour. Soy flour may contain many of the phytochemicals of a soybean. Soy flour comprises isoflavones in concentrations ranging from about one (1) milligram per gram (mg/g) to about three (3) mg/g of soy flour.

The term "sugar" as used herein refers to substantially all sugars and sugar substitutes, including any monosaccharide such as glucose or fructose, disaccharides such as lactose, sucrose or maltose, polysaccharides such as starch, oligosaccharide, sugar alcohols, or other carbohydrate forms such as gums that are starch based, vegetable based or seaweed based.

The term "sweetener" as used herein refers to essentially all sweeteners that are "carbohydrate"-based, as defined above under "carbohydrate" and further includes sweeteners that are "non-nutritive" as defined above under "additive" above.

Layered Cereal Bar Embodiments

The basic physical composition of the cereal bar is that of a "sandwich" composed of two cereal layers with a visible center or middle layer, e.g., a creamy milk-filling layer. In one embodiment, the cereal bar has a total nutrient level equal to or greater than the nutrient level of a single serving of ready-to-eat (RTE) cereal with milk. The milk filling can be a confectionery center that is high in milk content, but possesses a relatively low water activity. In one embodiment, the milk filling is a compound coating comprised of milk powder, sweeteners and fat. In one embodiment, the cereal layers are a cereal composition comprised of conventional RTE cereal, rice pieces and protein that are held together by a binder.

The cereal bar can be any suitable shape and size. In the embodiment shown in FIG. 1, the cereal bar 110 has a substantially rectangular shape. In an exemplary embodiment, the cereal bar is about nine (9) to 13 cm (about 3.5 to five (5) in) long, about 3.2 to four (4) cm (about 1.25 to 1.6 in) wide and about 1.9 to 3.2 cm (about 0.75 to 1.25 in) thick. FIG. 1 is not necessarily drawn to scale and does not necessarily represent the actual density or thickness of the various layers, nor the actual proportion of the components in the cereal bar 110.

In another embodiment, the cereal bar is substantially square-shaped. In another embodiment, the cereal bar is substantially round or oval-shaped. In yet another embodiment, the cereal bar is substantially o-shaped with a hole of any suitable diameter in the center. In yet another embodiment, the cereal bar is cut into bite-size pieces, and can be any suitable shape, such as any type of simple or complex shape. This includes regular geometric shapes (e.g., squares, rounds, triangles, hexagonals, tubes, and so forth) and irregular shapes, which can be patterned (e.g., figurines, animals, trees, holiday shapes, stars, pillows, twists, wagon wheels, etc.) or unpatterned, such as a nugget shape. Many of the geometric shapes, such as hexagonal, and various combinations of regular and irregular shapes (e.g., crab, palm tree and bird), can be interlocked together or "tessellated" such that when cut, there is no web or waste left over.

The layers can be of any desired thickness and can be arranged in any suitable way. In the embodiment shown in FIG. 1, the layers are arranged horizontally. Two outer cereal layers 111 and 112 surround an inner filling layer 114. In one embodiment, the cereal layers 111 and 112 are about 0.95 cm (about 0.375 in) to about 1.6 cm (about 0.675 in) thick. In one embodiment, the filling layer 114 is clearly defined and visible, having a thickness of at least about 0.16 cm (about 0.062 in). In another embodiment, the filling layer 114 has a variable thickness with a non-uniform appearance along the outside edge, such that some of the components in one or both of the cereal layers 111 and 112 impinge on the filling layer 114 in various locations. In another embodiment, some or all of the layers are arranged vertically inside the cereal bar. In another embodiment, some or all of the layers are twisted within the cereal bar 110 forming a swirled pattern.

In one embodiment, the filling layer 114 is a milk-filling layer. In another embodiment, the filling layer 114 is any type of creamy or chunky layer. This can include, but is not limited to, any type of peanut butter layer, chocolate layer, frosting layer, honey layer, yogurt layer, gelatin layer, fruit filling layer, and so forth. The filling layer can also be made with any other suitable foods or food combinations, including any type of additive. Examples include cereals and cereal pieces, granola pieces, nuggets, nuts, nut pieces, marshmallows, marshmallow bits (marbits), candies, candy pieces, cookies, cookie pieces, chocolates and chocolate products, including white and milk chocolates (e.g., chocolate chips, candy bars, etc.), other types of edible particulates (e.g., peanut butter chips, butterscotch chips, etc.), dried whole fruits (e.g., coconut, raisins, etc.), fruit parts, dried fruit products, fruit products (e.g., fruit syrups, etc.), and so forth.

In another embodiment, one or more additional ingredients are added to the filling layer 114 or to either or both of the cereal layers 111 and 112, including any of the creamy or chunky foods noted above. In yet another embodiment, there are four (4) to five (5) or more total layers. These layers can include one or more additional cereal and/or creamy filling layers.

In another embodiment, a topping layer is also present in addition to the filling layer 114. The topping layer can be a creamy topping, such as a frosting covering the entire surface of the cereal bar or a glaze that is drizzled onto the top layer. The topping layer can also be any other type of coating made from any of the foods noted above. In yet another alternative embodiment, dry or powdered ingredients are used as a topping layer either alone or in conjunction with a creamy topping layer. This includes, but is not limited to, colorings, sugars in various forms (e.g., brown sugar, white sugar, confectionery sugar, etc.), sugar substitutes, ground or powdered spices (e.g., cinnamon, nutmeg, cardamom, various salts, etc.), herbs, dried whole fruits flavorings and other flavorings as defined herein, which can be added as dried or powdered flavorings, other powdered toppings (including powdered fruits, milks, milk fractions, juices, cheeses, etc.), aromatic substances, including any type of taste-enhancing additives, and so forth.

In yet another embodiment, the layered cereal bar is partially or completely enrobed in a coating. The coating can be a liquid coating that solidifies at room temperature and is applied by dipping the layered cereal bar into a heated bath of the coating, such as a chocolate coating. Alternatively, the layered cereal bar can be submersed into a dry or powdered coating and rolled around until adequate coverage is obtained. This can include, for example, a dusting with cinnamon and sugar, milk powder and sugar, and so forth.

The filling layer 114 can be a confectionery filling with a milk content of about ten (10) % or more and a water activity of about 0.45 or less. In another embodiment, the filling layer 114 is a compound coating. In yet another embodiment, the filling layer 114 is a visible milk filling layer comprised of milk powder, sweeteners and fat in a ratio of about 1:2:1.4. Unlike typical compound fillings being used in conventional European "high milk" confections, this type of milk filling is lower in fat, having about 25 to 35% total fat content. In one embodiment the milk powder, sweeteners and fat are combined in a ratio of about 1:2:1.4. Additionally, other minor ingredients can be added, including, but not limited to, antioxidants, mono- and diglycerides and/or emulsifiers, such as soy lecithin, flavorings and colorings. In a specific embodiment, the filling layer 114 is a milk filling layer comprising about 17 to 21%, by weight, of the cereal bar and has a minimal water activity of about 0.25 to 0.35. The filling layer 114 is discussed further in reference to FIG. 2A.

The cereal layers 111 and 112, comprised of conventional RTE cereal 116, rice pieces 118 and protein nuggets 120, are held together by a binder (not shown). Any known RTE cereal 116 or RTE cereal combinations can be used in the cereal layers 111 and 112. The cereal 116 in the cereal layers 111 and 112 are identifiable and recognizable, although not all are necessarily whole. However, it is expected that there will be at least one whole cereal piece somewhere on the cereal bar surface. In some embodiments, there may be portions of cereal 116 present on the cereal bar surface or the cereal piece may be partially crushed or broken. In the embodiment shown in FIG. 1, the cereal 116 in the cereal layers 111 and 112 is an o-shaped cereal, such as Honey Nut Cheerios®. In other embodiments, the RTE cereal in the cereal layers 111 and 112 is comprised of other cereal pieces such as flakes, shreds, biscuits, rings, spheres, squares, rounds, triangles, hexagonals, tubes, oblongs, and so forth, including any other desired shape discussed above in relation to the possible shapes for the cereal bars themselves.

In other embodiments, the cereal layers 111 and 112 can contain any known RTE cereal such as any type of Cheerios® (e.g., regular Cheerios®, Apple Cinnamon Cheerios®, Honey Nut Cheerios®), any type of Chex® (e.g., Honey Nut Chex®, Wheat Chex®, Rice Chex®, Corn Chex®, Bran Chex®), Cocoa Puffs®, Cinnamon Toast Crunch®, Oatmeal Raisin Crisp®, Wheaties®, Total®, generic substitutes for these and other RTE cereal products, various combinations of one or more cereal types, and so forth.

RTE cereals typically have a moisture content of less than about three (3) % and an Aw of about 0.2. RTE cereal is an excellent source of many nutrients, including protein and fiber. In one embodiment, the cereal 116 comprises about one (1) to two (2) g of declared fiber or about 2.5% to about four (4) %, by weight, of the final product. In one embodiment, the RTE cereal is modified to increase or decrease fiber or other ingredients. For example, additional raisins can be added. In another embodiment, a sugar coating, i.e., slurry coating, is added to the outside of the RTE cereal. A sugar coating is used as a flavoring, but can also serve to improve shelf life and texture. In yet another embodiment, an "oat-predominant" (greater than 50% oats dwb) cereal base can be replaced with an "oat-containing" (less than 50% oats dwb) cereal base. An "oat-containing" formulation has known advantages relating to shelf life, since oats are known to lose freshness sooner than other grains due to their lipid content. It is also possible to substitute or add any number of other grains into the cereal base, including sorghum, rye, wheat, barley, and so forth, in any suitable ratio, depending on the particular application. In one embodiment, the RTE cereal comprises about 20 to 25% by weight of the total layered cereal bar.

The cereal layers 111 and 112 further contain extruded high-protein rice pieces 118. Rice is used to provide protein and to add additional crispy texture to the cereal bar 110. Further, since rice tastes relatively bland, there is no off-flavor to interfere with the flavor of the cereal 116. In one embodiment, the high-protein rice pieces 118 are made by incorporating soy protein in extruded rice pieces at very high levels of about 50% or higher. In a particular embodiment, high-protein rice pieces 120 are obtained from Ringger Foods, Gridley, Ill. or Du Pont Protein Technologies International (PTI) in St. Louis, Mo. The rice pieces 118 can be any suitable size and shape. It is known that the size and shape of the rice pieces can vary depending on manufacturing conditions, machine die plates, formulation, and so forth. In one embodiment, the rice pieces 118 have an elongated oval shape. In another embodiment, the rice pieces 118 have a variety of diameters ranging from about two (2) mm to about eight (8) mm. The various sizes of rice pieces 118 act as fillers within the cereal layers 111 and 112. The density of the rice pieces 118 can vary depending on the particular type of rice used, method of producing the rice pieces, and so forth. In one embodiment, the density of the rice pieces 118 range from about 10.7 to 29 g/100 cc (about 175 to about 475 g/100 cu in). In a particular embodiment, a soy crisp rice piece having a density of about 18.3 to 23.3 g/100 cc (about 300 to 382 g/100 cu in) is used. In one embodiment, the rice pieces 118 comprise about 7.5 to 12%, by weight, of the final product.

In the embodiment shown in FIG. 1, the cereal layers 111 and 112 further contain texturized vegetable protein (TVP) 120 as an additional source of protein and fiber. TVP 120 naturally has a light or dark beige color, as it is essentially soy flour that has been extruded to produce a minced end product. The extruded soy flour has no particular shape, as the pieces are essentially "nuggets," which are sometimes referred to as "ragged" in appearance. TVP 120 typically has a particle size of two (2)% max on four (4) Mesh U.S. Sieve, five (5) to 15% max on five (5) Mesh U.S. Sieve, zero (0) to 60% max on eight (8) Mesh U.S. Sieve, and ten (10)% max through 16 Mesh U.S. Sieve. In one embodiment, the average diameter of the TVP 120 is about two (2) to about five (5) mm. TVP 120 provides an inexpensive source of protein, yet adds a desirable crispy texture. Typically TVP 120 has a protein content of at least about 50%, although TVP having a lower protein content can also be used. In one embodiment, the protein content is about 52%. Typically, TVP has a cold-water absorption of about 2.5 to three (3) ml/g and a bulk density greater than about 0.26 g/cc, up to about 0.4 to 0.5 g/cc. TVP further contains about 18% fiber. In one embodiment, TVP comprises about 7.5 to 12%, by weight, of the final product.

In a particular embodiment, "Experimental 4030 Minced Textured Soy Flour" (Cargill 4030) from Cargill Protein Products in Cedar Rapids, Iowa, is used. Cargill 4030 has a water absorption greater than about 3.2 ml/g, but has been measured as high as about 4.5 ml/g. Cargill 4030 further has a lower bulk density than conventional TVP, in the range of about 0.227 to 0.267 g/cc. As a result, Cargill 4030 absorbs water more slowly than conventional texturized vegetable proteins. In another embodiment, Cargill's "Experimental 4025 Minced Textured Soy Flour," which is darker in color, is used.

Since TVP is made from soybeans, it can have high levels of raffinose and stachyose, which are known to cause flatulence. Additionally, the presence of lipoxygenase can cause undesirable off-flavors. In one embodiment, the protein source in the cereal layer is soy protein concentrate or soy protein isolate. In yet another embodiment, off-flavors are masked using artificial masking agents known in the art. The use of TVP (as well as the soy product in the binder, discussed below) provides the consumer with all the health benefits soy is known to provide, including the benefits related to the intake of isoflavones, phytoestrogens, and so forth.

The cereal 116, rice pieces 118 and TVP 120 can be combined in any suitable ratio. In one embodiment, they are combined in a ratio of about 2:1:1, respectively. In another embodiment, high protein rice is not used in the cereal layer, and TVP is used as the sole source of additional protein. Although the organoleptic properties of the final product may be less desirable due to the presence of additional TVP, such an embodiment may be desirable in certain low income markets, including, but not limited to, third world countries, suppliers of bulk food programs such as programs providing emergency relief, and so forth. In yet another embodiment, TVP is not used in the cereal layer, and high protein rice is used as the sole source of additional protein. Although the cost of the final product may be higher due to the presence of additional high protein rice, such an embodiment may be desirable in particular select markets, including, but not limited to, upscale restaurants, food stores, and so forth. In yet another embodiment, the cereal pieces themselves are fortified with additional protein, and neither high protein rice nor TVP is used in the cereal layer. Although this embodiment would not have the varied texture provided by the TVP and rice pieces, the appearance and texture of a cereal bar containing only whole cereal pieces (and a binder) in the cereal layers may be appealing in certain markets.

The binder or "glue" used to hold the other ingredients in the cereal layers 111 and 112 together can be any type of suitable binder depending on the type of RTE cereal used. In one embodiment, a carbohydrate-gelatin binder comprised of a sugar solution, a soy protein/fat mixture, and hydrated gelatin is used. Use of a carbohydrate-gelatin binder with certain RTE cereals improves storage stability, as compared with a carbohydrate non-gelatin binder, by slowing moisture uptake, which can cause various textural defects in the cereal, rice and TVP. In another embodiment, use of a carbohydrate/aqueous binder versus a conventional maltodextrin/fat-based binder has the further advantage of providing no added fat. In one embodiment, the sugar solution is comprised of wet ingredients, including corn syrups and glycerin, and dry ingredients such as various sugars, (i.e., fructose, sucrose, etc.), as well as minor ingredients such as calcium, sorbitol, maltodextrin and salt. In one embodiment, the ratio of wet to dry ingredients is about 2.2:1. In another embodiment, about 0.5% water is added to the sugar solution, producing a water activity of about 0.45 to 0.60 in the finished binder.

The soy protein/fat mixture can be comprised of soy protein isolates suspended in a suitable amount of fat. In one embodiment, soy protein and fat are combined in a ratio of about 3:2. In one embodiment, the hydrated gelatin is comprised of water and gelatin in a ratio of about 4:1. In another embodiment, minor ingredients such as antioxidants, flavorings, colors, vitamins, minerals and emulsifiers are added to the soy protein/fat mixture. In an alternative embodiment, the vitamins and minerals are present in the RTE cereal itself, the filling and/or in any other layer or topical coating. The process of making the binder is discussed further in reference to FIG. 2B. The cereal layers 111 and 112 and binder can be bonded together in any suitable ratio. In one embodiment, they are bonded in a ratio of about 1:1:1.

The layered cereal bar 110 can have any suitable moisture content and water activity. Water activity is known to play an important role in relation to product stability. Experiments have demonstrated that for each cereal and binder combination, there is a relatively narrow ideal Aw target range. This target range is related primarily to cereal texture and binder texture/plasticity. Specifically, as the Aw increases, the cereal texture is negatively impacted, becoming soggy and stale at some specific value, depending on the cereal selected. However, as the Aw decreases, the binder becomes more crystalline and brittle due to the absence of the plasticizing effect of water. As a result of these competing requirements, a relatively narrow Aw range between about 0.35 and 0.55 has been identified as an ideal target range in most cases. In another embodiment, the Aw range is between about 0.4 to 0.5. The latter Aw range is typically achieved when the Aw of the binder is between about 0.50 and 0.60, and the Aw of the filling, such as a milk filling, is between about 0.25 and 0.35. In one embodiment, most of the moisture in the product is incorporated in the binder. In this embodiment, the filling has very little, if any, water, i.e., less than about one (1) %, which comes from the inherent moisture in its raw ingredients. Such an approach decreases moisture equilibration time and results in a more stable product.

In one embodiment, the cereal bar has a moisture content of about six (6) to eight (8) % and an Aw of about 0.4 to 0.45. For a cereal bar to be crispy, the Aw needs to be less than about 0.45. With certain types of cereal bars, however, such as those containing oatmeal and raisins, a higher Aw is acceptable because of the presence of relatively soft and chewy components, such as raisins. If the Aw is too low, the product can be dry and crumbly. In one embodiment, the cereal bar 110 has a "crispy-chewy" texture such that the initial taste sensation is crispy and crunchy. However, as eating continues, there is ultimately a noticeable chewiness to the texture.

Conventional food bars typically weigh about 20 g, with some weighing up to about 27 g. The novel cereal bar of the present invention can weigh any suitable amount, depending on the particular size and shape. In one embodiment, each cereal bar is intended to essentially substitute for a conventional bowl of cereal with milk, such that it provides at least the same nutrition. In one embodiment, each cereal bar weighs more than about 50 g. In a particular embodiment, the cereal bar weighs about 35 to 50 g and the ratio of cereal composition, binder and filling is about 2:2:1.

The layered cereal bar can be packaged in any suitable manner. In one embodiment, each cereal bar is individually wrapped. In a particular embodiment, each cereal bar is individually "pouched" in a flexible metallized film known in the art. Any number of individually wrapped cereal bars can be packaged in a secondary container or carton. In one embodiment, a single pouch is placed in an individual carton, such as for use in fast food restaurants, airplanes, and so forth. It is also possible to ship individual pouches without placing them in individual cartons. In a particular embodiment, small, regular or king-sized cereal bars are packaged to be individually dispensed in a vending machine. In one embodiment, six (6) pouches are packaged together in a consumer-sized container. In another embodiment, less than six (6) pouches are placed in a carton. In yet another embodiment, seven (7) to 12 pouches or more are placed in a carton. In one embodiment, the consumer-sized container is about 2,000 to 5,000 cc and holds more than one pouch. In another embodiment, a large slab of layered cereal bar, such as about 25 cm by 35 cm (about ten (10) in by 14 in), is packaged in a flexible metallized film for use in a food service facility where it is cut into individual servings to be sold at a later time.

According to known international standards, a single serving of most cereals is considered to be about 30 g, which corresponds to a volume of from about 0.2 to 0.3 Liters (L) (about 0.75 to 1.25 cups). (A single serving of denser cereals, such as a granola, muselix, or fruit and nut bran cereals, is about 50 to 55 g). A single serving of cereal provides about one (1) to two (2) g of protein. When combined with about 0.1 L (about ½ cup) of milk having about four (4) g of protein, a bowl of cereal with milk averages about six (6) g of protein. In one embodiment, the layered cereal bar of the present invention provides the "nutrition of a bowl of cereal with milk," i.e., up to about six (6) g of total protein.

The label for the layered cereal bar can include nutritional information that includes a statement that each cereal bar has "the nutrition of a bowl of cereal and milk" or "the nutrition of a bowl of cereal with milk." The details on the nutritional content of the cereal bars can be presented both on the outside carton as well as on each individually wrapped layered cereal bar. In one embodiment, the information on a nutrition label might read as follows:

INGREDIENTS: Cereal [Whole Grain Oats (includes the oat bran), brown rice flour, corn meal; sugar; wheat starch; honey; salt; calcium carbonate; partially hydrogenated soybean oil; barley malt extract; trisodium phosphate; almond meal; wheat flour, vitamin E (mixed tocopherols) added to preserve freshness]; milk filling [milk; sugar; lactose; palm kernel oil; partially hydrogenated soybean oil; soy lecithin; mono and diglycerides; natural and artificial flavor, freshness preserved by BHT]; soy flour; corn syrup, soy protein isolate; rice flour; fructose; high fructose corn syrup, sugar, partially hydrogenated soybean oil; glycerin; maltodextrin; tricalcium phosphate; sorbitol; almonds; malt extract; color added; gelatin; salt; honey; natural flavor; freshness preserved by BHT.

VITAMINS AND MINERALS: Zinc and Iron (mineral nutrients); a B vitamin (niacinamide); vitamin C (sodium ascorbate); vitamin A palmitate); vitamin D, vitamin $B_6$ (pyridoxine); vitamin $B_2$ (riboflavin); vitamin $B_1$ (thiamin mononitrate); vitamin $B_{12}$; a B vitamin (folic acid).

CONTAINS: milk, soy, almond, and wheat ingredients.

In the above label, cereal, present in the largest quantity, is listed first. The second ingredient is a milk filling. Milk is the first ingredient of the milk filling, which is in the form of milk powder as discussed below. A suitable label also contains all of the nutritional information required by law, including the % daily value (DV) of various components, including information on the total fat (including saturated fat, polyunsaturated fat, monounsaturated fat), cholesterol, sodium, potassium, total carbohydrate (including dietary fiber, sugars, other carbohydrates) and protein. A statement to the effect that, "the % DV is based on a 2,000 calorie diet, and an individual's daily values may be higher or lower depended on calorie needs," can also be present on the label. This can be accompanied by a table showing the total content of fat, including saturated fat, cholesterol, sodium potassium and total carbohydrates, including dietary fiber, in a single serving, based on a calorie intake of 2000 and 2500 calories. Information on various vitamins and minerals, such as vitamin A, vitamin C, iron, vitamin D, thiamin, riboflavin, niacin, vitamin $B_6$, folic acid, vitamin $B_{12}$, calcium, phosphorus, magnesium, zinc and copper can also be on the label.

In one embodiment, there are about four (4) to five (5) g of total fat in a 40 g bar, of which about 1.8 to two (2) g is saturated fat. In one embodiment, the total carbohydrate level is about 65%, by weight, of the layered cereal bar. The total carbohydrate level is comprised of about 3 to 4% dietary fiber, 50 to 60% sugar, and about 36 to 47% complex carbohydrates. In a 40 g cereal bar, for example, there is about 25.6 g of total carbohydrates, of which about 0.8 to one (1) g is dietary fiber, about 12.8 to 15.4 g is sugar and about 9.2 to 12 g are complex carbohydrates. In another embodiment, additional fiber in any suitable form, such as an invisible fiber is added to increase the total fiber percentage to about 5 to 10%. In one embodiment, inulin is added.

Methods and Apparatus for Making Layered Cereal Bars

The present invention provides methods and apparatus for making layered cereal having a visible filling layer comprising mixing a binder with a cereal composition having identifiable cereal pieces to form an amorphous mass or mixture, compressing the amorphous mass into a first layer and a second layer, applying a filling layer on the first layer, combining the first layer and filling layer with the second layer, and pressing the first layer, filling layer and second layer together to form pressed layers, wherein the pressed layers are cut into individual cereal bars having identifiable cereal pieces.

Figure 2A:
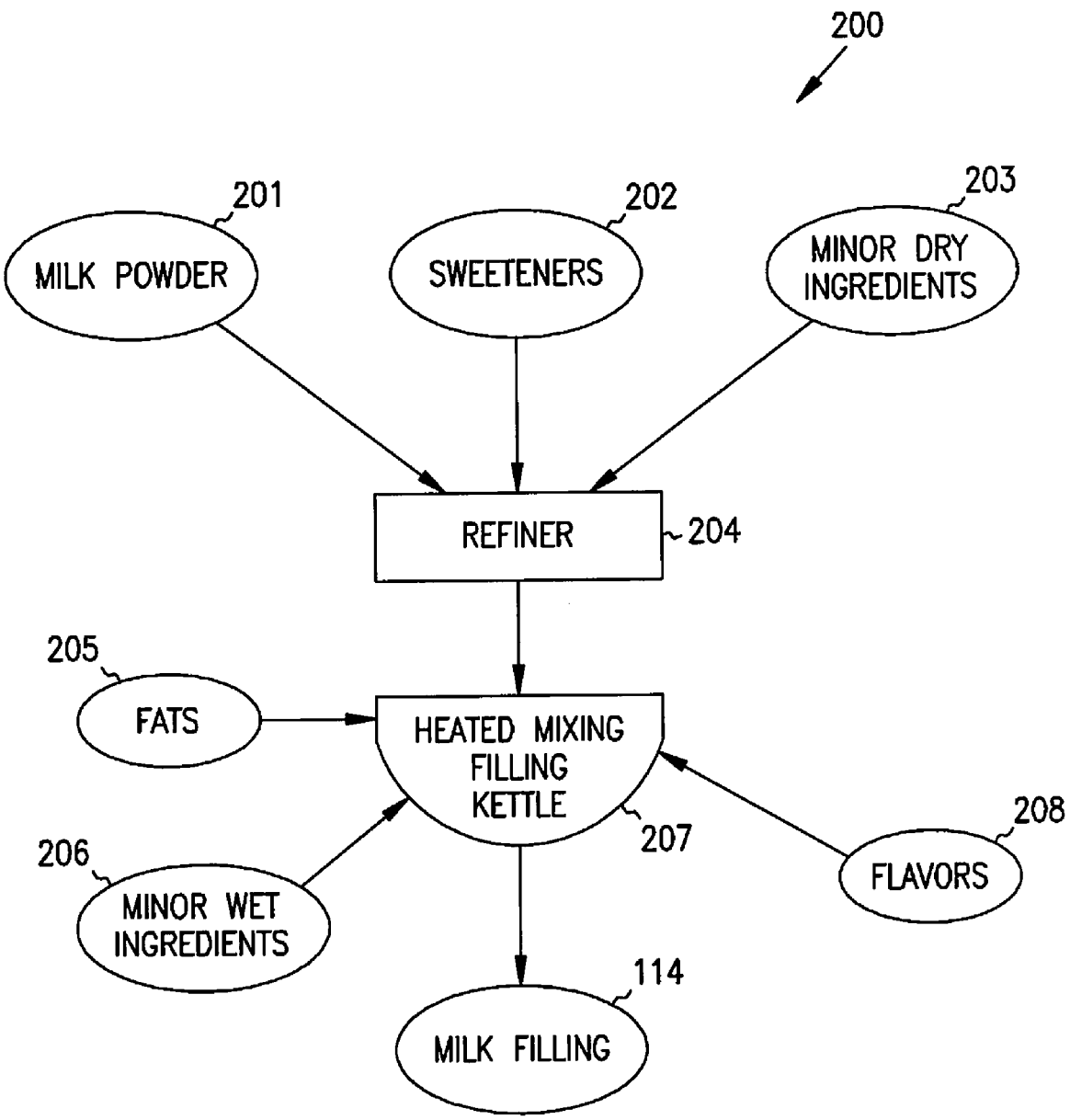
FIG. 2A is a simplified flow diagram of a process for making a milk filling in one embodiment of the present invention.

FIG. 2A shows one embodiment of a milk filling process 200 for preparing a milk filling for the filling layer of the present invention. In this embodiment, milk powder 201, sweeteners 202 and any minor dry ingredients 203, such as dry colors, flaked emulsifiers, and so forth, are combined and refined in a refiner 204 to reduce their particle size. These components enter the process 200 at ambient temperature, which can be as high as 38° C. (190° F.) or more in a manufacturing plant. The refined ingredients are then combined with fats 205 and any minor wet ingredients 206, such as oil-based colors, emulsifiers, and so forth, in a heated mixing "filling" kettle 207 to produce the filling, i.e., milk filling 114. In one embodiment, flavors 208 are also added to the filling kettle 207 at any suitable time. In a particular embodiment, flavors 208 are added last to avoid any adverse affects from prolonged exposure to heat.

The milk powder 201 in the milk filling 114 can have any fat content desirable. In one embodiment, whole milk powder having about 25 to 30% fat is used. In another embodiment, milk powder having less than about 25%, down to about 4% fat is used. In yet another embodiment, skim milk powder having a maximum fat content of about 1.25% is used. In one embodiment, skim milk powders processed under low heat conditions, i.e., "low-heat" powders are used. Such powders have a relatively bland flavor without any cooked notes from scorched flavor or odors. In another embodiment, high-heat powders are used which are typically more stable than low-heat powders. Further, off-flavors don't occur as fast when the milk powder is subjected to higher heat at the beginning of processing, and high-heat milks typically have a more cooked flavor as a result. In one embodiment, combinations of low-heat and/or high-heat skim and whole milk powders in about a 1:1 ratio are used.

The sweeteners 202 in the milk filling 114 can be any suitable types of sweeteners. In one embodiment, carbohydrate sweeteners are used, including, but not limited to any type of sugar or sugar combination, corn syrup solids and/or maltodextrins, or a combination thereof. Any suitable type of fats 205 can be used in the milk-filling layer 114. In one embodiment, hydrogenated vegetable oil is used. In a particular embodiment, palm kernel oil and soybean oil are used in a ratio of about 1:1. Palm kernel oil has a sharp melting point and is a relatively inexpensive and common source of fat.

The components can be combined according to any suitable ratio. For example, for approximately every 45 kg (100 lbs) of milk filling 114 produced, about 11.4 kg (25 lbs) of milk powder 201, 20.5 kg (45 lbs) of sweeteners 202, and 13.6 kg (30 lbs) of fats 205 are used. In one embodiment, of the 20.5 kg (45 lbs) of sweeteners 202 used, about nine (10.5) kg (23 lbs) is sugar, while the remainder is lactose. Further, in most embodiments, less than about 0.45 kg (one (1) lb) of the minor ingredients 203 and 206 are added.

In one embodiment, the heated mixing kettle 207 is a swept surface tank. In another embodiment, separate kettles are used for mixing and holding the milk filling 114. In a particular embodiment, the flavors 208 are added separately to the holding or "use" kettle, rather than to the "mixing" kettle. The mixture is heated for any suitable time, depending on the mixing speed. In one embodiment, the mixture is heated for less than about three (3) to four (4) hours or more. Any suitable temperature can be used in the "filling" kettle 207. In one embodiment, the temperature is greater than about 38° C. (about 100° F.). The resulting milk filling 114 has a viscosity of about 10,000 to 15,000 cp. In another embodiment, the filling ingredients are combined without the refining and/or heating step to produce a confection.

Figure 2B:
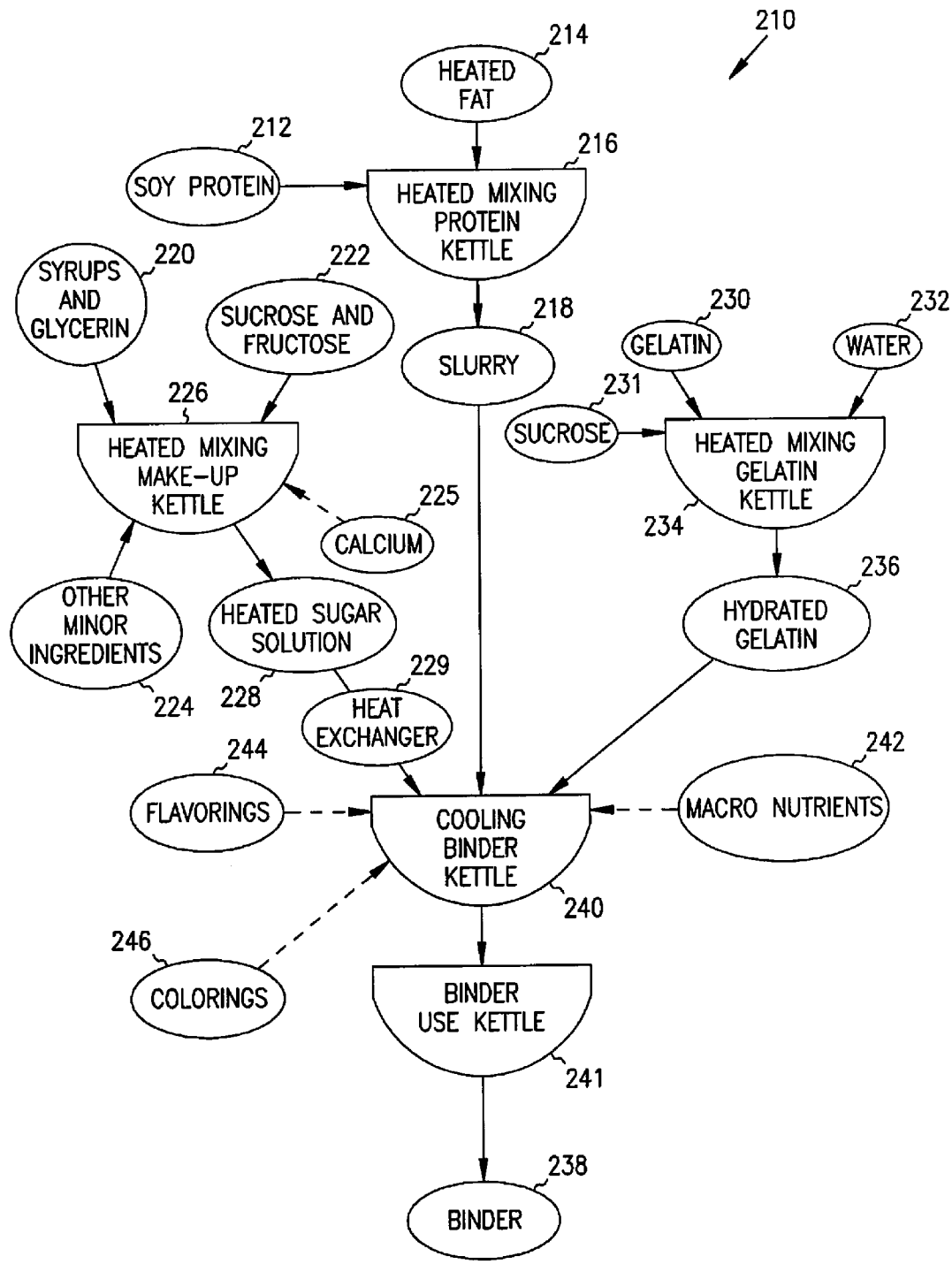
FIG. 2B is a simplified flow diagram of a process for making a binder in one embodiment of the present invention.

The binder is prepared according to a batch binder process, such as the process shown in FIG. 2B. The process begins by stirring in soy protein 212 with pre-heated shortening or fat 214 in a heated mixing "protein" kettle or vessel 216. Any suitable source of soy protein can be used, such as soy protein concentrates or soy protein isolates. In a particular embodiment, soy protein isolates from Arthur Daniel Midland (ADM) Co. in Decatur, Ill. or PTI in St. Louis, Mo., are used. The soy protein 212 is suspended in fat rather than water to avoid the formation of a gel. Any suitable amount of soy protein 212 can be added to the fat 214. In one embodiment, the soy protein 212 and fat 214 are combined in a ratio of about 3:2. For example, for every 150 kg (330 lbs) of soy protein 212 (dwb) added, about 100 kg (220 lbs) of fat 214 is used. In one embodiment, a soy protein isolate is used having an initial viscosity of about 1,000 to 3,000 cp and soy oil is used for the fat 214, having an initial viscosity of about 1,000 cp. The soy protein 212 and fat 214 can be heated and mixed in any suitable type of vessel. In one embodiment, the components are heated and mixed together in a swept surface tank. The mixture is heated for any suitable time, depending on the mixing speed. In one embodiment, the mixture is heated for less than about three (3) to four (4) hours. In another embodiment, the mixture is mixed with a high-speed mixer or liquefier for less than about three (3) minutes. Any suitable temperature can be used in the protein kettle 216. In one embodiment, the temperature is greater than about 32° C. (about 90° F.). After being heated and mixed, the resulting slurry 218 is flowable, but can have a viscosity of up to about 3000 cp.

In a separate step, syrups, glycerin and sugars can be combined to form a sugar solution in a heated mixing make-up kettle 226. In the embodiment shown in FIG. 2B, the sugar solution 228 is comprised of liquid syrups and glycerin 220, dry sugars, such as a sucrose/fructose combination 222, and other minor dry ingredients 224, although the invention is not so limited. In one embodiment, the sucrose and fructose are combined in a ratio of about 1:175. In other embodiments, alternate combinations are used, such as various amounts of dextrose, maltose, xylose, trehalose, and/or other sugars for a portion of the sucrose and/or fructose and/or sucrose/fructose blend.

In one embodiment, the ratio of wet to dry ingredients is about 2:1, or in some embodiments, about 2.2:1. For example, with a 908 kg (2,000 lb) batch of heated sugar solution 228, there are about 627 kg (1,380 lbs) of wet ingredients, and about 281 kg (620 lbs) of dry ingredients. The mixture can be heated for any suitable time at any suitable temperature, depending on the batch size, kettle size, and so forth. In one embodiment, a 908 kg (2,000 lb) batch is heated from ambient temperature to about 88° C. (190° F.) in about 35-45 minutes. The viscosity of the heated sugar solution 228 is about 10,000 to 100,000 cp, depending on the temperature of the mixture. In the embodiment shown in FIG. 2B, the heated sugar solution 228 then passes through one or more heat exchangers 229 in order to reduce the temperature of the heated sugar solution 228 to avoid denaturing protein present in the cooling binder kettle 249. In one embodiment a swept surface heat exchanger made by Waukesha Cherry-Burrell, A United Dominion Co., Louisville, Ky., is used to reduce the temperature of the heated sugar solution 228 from about 88° C. (190° F.) to about 130° F. In another embodiment a Contherm® Swept Surface Heat Exchanger made by Alfa Laval Contherm, Inc., in Newburyport, Massachusetts, is used.

As noted above, macronutrients, i.e., vitamins and minerals, can be added at any stage of manufacturing. However, some macronutrients are more heat sensitive than others, such as certain vitamins, and others may require more time to disperse, such as calcium. Alternately, components can be fractionated, or more soluble forms of components, such as calcium, can be used. In the embodiment shown in FIG. 2B, a calcium supplement 225 is also added to the make-up kettle 226. Any form of calcium 225 can be used, such as calcium carbonate ($CaCO_3$), tricalcium phosphate ($Ca_3(PO_4))_2$, i.e., TCP), and so forth. $CaCO_3$, however, is less concentrated than TCP such that higher amounts of $CaCO_3$ must be added to obtain the same level of usable calcium, which can adversely affect the viscosity of the sugar solution 228, and ultimately of the binder 238. Furthermore, $CaCO_3$, has a grittier and chalkier taste than TCP. In one embodiment, TCP, in the form of a fine powder having a mean particle size of between about one (1) to 45 microns in diameter, is used. In a particular embodiment, about 50% of the particles have a micron size less than about 6.5. Any suitable quantity of TCP can be used. In one embodiment, the percent of TCP in the sugar solution 228 is about two (2) %.

In one embodiment, the ratio of TCP to binder 238 is about 1:40 or about two (2) to three (3) % on a weight basis. For example, for a 908 kg (2,000 lb) batch of binder 238, about 23 kg (50 lbs) is TCP and about 880 kg (1,950 lbs) is the total weight of the remaining binder ingredients, representing a ratio of about 1:40 or 2.5% TCP content in the binder 238 on a weight basis. This level of TCP provides about 25% of the recommended daily value (DV) of calcium per 40 g of layered cereal bar.

In another separate step, conventional powdered gelatin 230 and sucrose 231 are hydrated in water 232 in a heated mixing "gelatin" kettle 234 to produce hydrated gelatin 236. This step is similar to the process used to make gelatin in the home. In one embodiment, the gelatin 230, sucrose 231 and water 232 are combined in the gelatin kettle 234 in a ratio of about 6:4:15. In another embodiment, no added sucrose 231 is used, and the gelatin 230 and water 232 are combined in a ratio of about 4:1. Any suitable temperature can be used to hydrate the gelatin 230. In one embodiment, the mixture is heated to about 66 to 77° C. (about 150 to 170° F.). Temperatures higher than about 77° C. can degrade the gelatin 230. At temperatures below about 66° C., the gelatin 230 will not dissolve in the water 232. In one embodiment, the gelatin 230 is not whipped to avoid creating the appearance of marshmallow, which is opaque white in color, less dense and stringier than gelatin, which is not whipped. The resulting hydrated gelatin 236 is relatively colorless and translucent, which helps to create a chewy, layered cereal bar.

The binder 238 is produced when the fat/protein slurry 218 is combined together with the heated sugar solution 228 and hydrated gelatin 236 in the cooling binder kettle 240. In one embodiment, the slurry 218 and hydrated gelatin 236 are folded into the sugar solution 228. Using the same 908 kg (2000 lbs) batch of binder 238 as in the example above, the sugar solution 228 containing the calcium 225 comprises about 772 kg (1700 lbs), the protein slurry 218 comprises about 113.5 kg (about 250 lbs), and the hydrated gelatin 236 comprises about 11.4 kg (about 25 lbs). Minor ingredients, such as flavors, colors, and water can comprise up to about 20.4 kg (about 45 lbs). The binder 238 can be kept at any suitable temperature. In one embodiment, the binder is transferred to a binder use kettle 241 and stored at a temperature of between about 49 to 60° C. (about 120 to 140° F.).

Additional components that can be added are shown in FIG. 2B. Specifically, macronutrients 242 can be added at any time in the process to nutritionally fortify the layered cereal bars. It is known that the potency of heat-sensitive macronutrients, such as vitamin C and vitamin A, can degrade upon exposure to heat for prolonged periods of time. In one embodiment, vitamin and mineral macronutrients 242 are combined in a specific vitamin/mineral blend and added after all of the other components in the binder 238 have been combined. Some vitamins may also discolor the final product, but typically such discoloration cannot be seen due to the colors of the other components in the cereal layers. Other additives include flavorings 244 and colorings 246. Flavorings and colorings are typically added last into the binder kettle 240 because they can also be adversely affected by heat. In one embodiment, the viscosity of the binder 238 is about 20,000 to 100,000 cp or higher, depending on temperature, protein content, and so forth. In a particular embodiment, the binder 238 has a viscosity of about 20,000 cp at about 88° C. (about 190° F.) and a viscosity of about 100,000 at about 54° C. (about 130° F.).

Figure 3A:
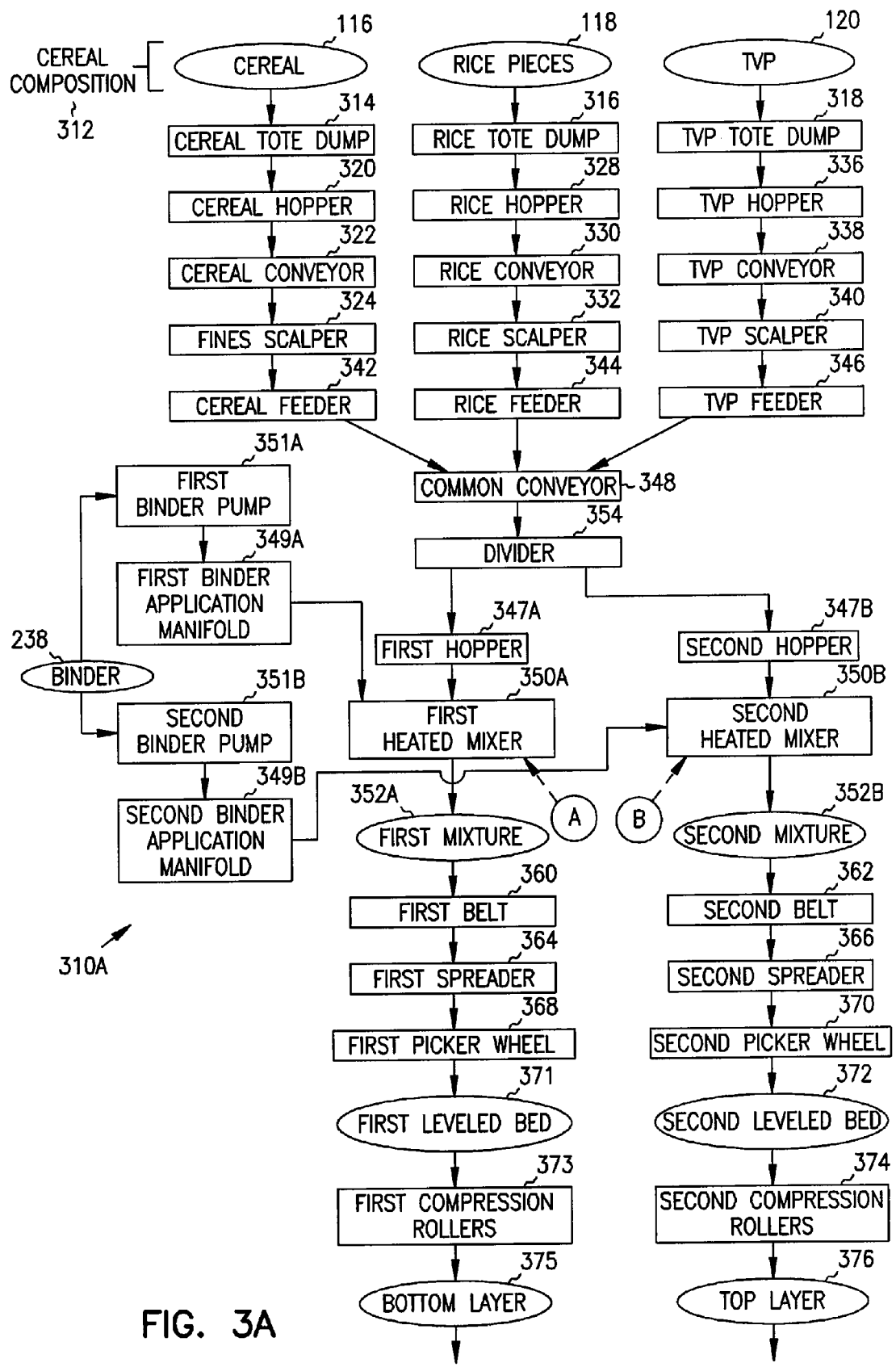
FIG. 3A is a simplified flow diagram of a first part of a process for making a layered cereal bar through the step of forming a bottom layer and a top layer in one embodiment of the present invention.
Figure 3B:
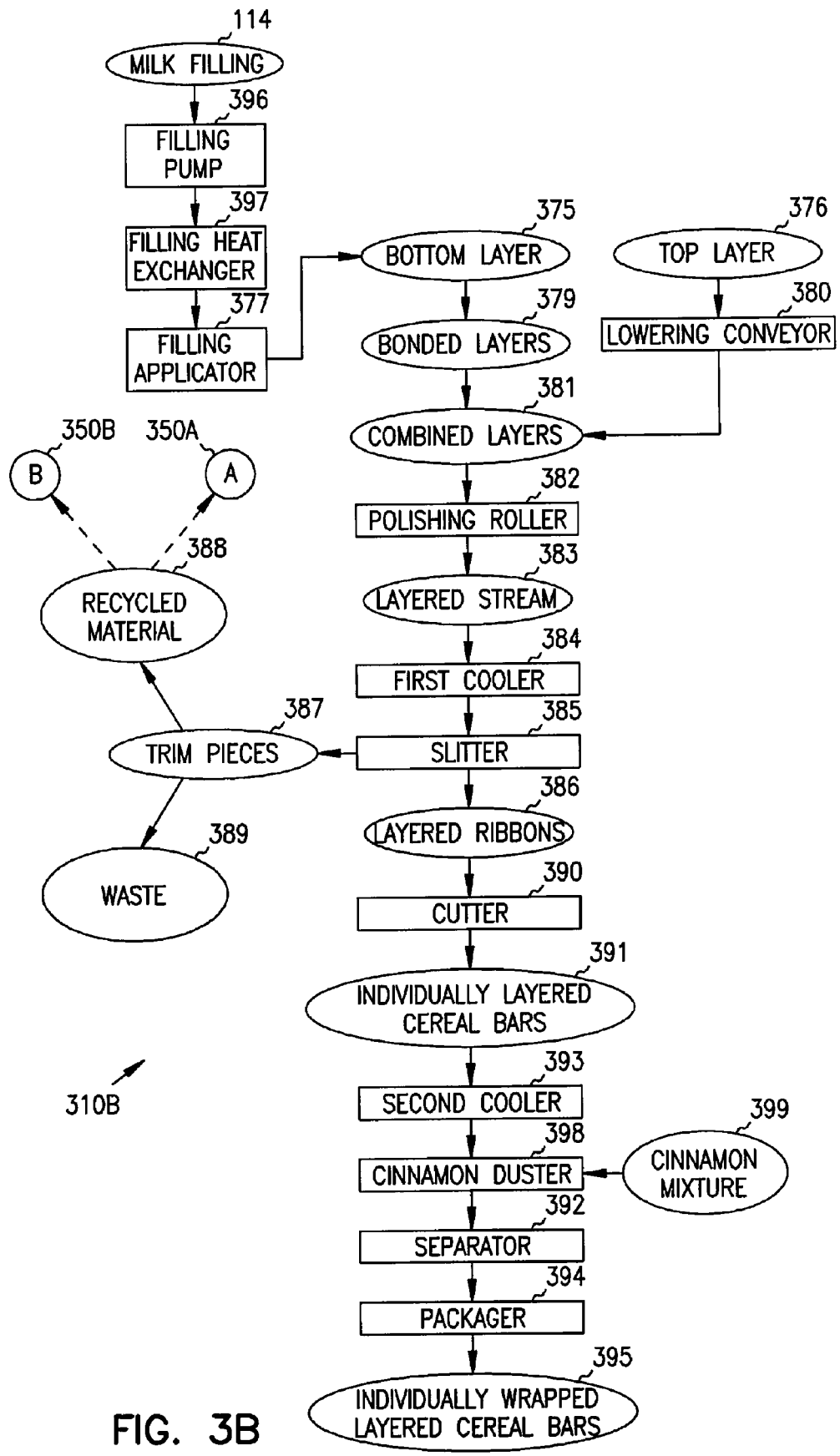
FIG. 3B is a simplified flow diagram of a second part of a process starting with the step of adding milk filling to the bottom layer in one embodiment of the present invention.

The binder 238 is combined with other ingredients to make the layered cereal bars in a layered cereal bar process 310A and 310B, such as in the process shown in FIGS. 3A and 3B, respectively. In one embodiment, cereal 116, rice pieces 118 and TVP 120 comprise the cereal composition 312 (which is sometimes referred to as a cereal "base" for the layered cereal bars, as distinguished from the base or slurry used to produce RTE cereals), although the invention is not so limited. In one embodiment, the cereal 116, rice pieces 118 and TVP 120 are combined in a ratio of about 2:1:1. Prior to being added to first and second heated mixers ("A" and "B") 350A and 350B, respectively, bulk amounts of each component of the cereal composition 312 can be placed in their respective tote dumpers 314, 316, 318. As is known in the art, a tote dumper is a hydraulic lift that inverts a tote of ingredients into a hopper or bin. Typically, totes are lined cardboard boxes holding about 300 lbs of any particular ingredient. The cereal passes through a cereal hopper 320 onto a cereal conveyor 322. In the embodiment shown in FIG. 3A, the cereal 116 next passes through a fines scalper (or sifter) 324 to remove fines and small particles. Similarly, the rice 118 passes through a rice hopper 328 onto a rice conveyor 330. In this embodiment, a rice scalper 332 is then used to remove small particles. Likewise, the TVP 120 passes through a TVP hopper 336 onto a TVP conveyor 338. Again, in this embodiment the TVP 120 also passes through a TVP sifter 340 to remove small particles.

Any type of conveyor known in the art can be used for the conveyors 322, 330, 338. In one embodiment a cleated inclined belt conveyor is used. After exiting their respective scalpers 324, 332, 340, the components fall into individual feeders 342, 344, 346, respectively, and then onto a common conveyor 348. Any type of feeders known in the art can be used. In one embodiment, loss-in-weight feeders are used which can deliver a constant weight of ingredient per unit time. In a particular embodiment, a Model 300 K-Tron Feeder made by K-Tron America Co. in Pitman, N.J. is used. Any type of conveyor can be used as the common conveyor 348. In one embodiment, a common dry supply conveyor is used.

The cereal composition 312 then passes through a divider 354. Any suitable type of divider 354 that serves to divide the dry cereal composition 312 into two fractions can be used. In one embodiment, the divider 354 is a gate that is flipped back and forth on a timing mechanism, which causes the dry cereal composition 312 to fall into hoppers 347A and 347B located above each mixer 350A and 350B, respectively. Each hopper 347A and 347B further has means to control the flow of cereal composition 312 into each mixer 350A and 350B.

In one embodiment, a constant speed screw is located in the bottom of each hopper 347A and 347B to keep the flow constant rather than cyclical, so as to maintain a constant ratio between binder and dry mix. Without the timing device and constant speed screws, the flipping of the gate back and forth would cause the ratio of binder and dry material in the stream to constantly vary. In one embodiment, conventional level sensors, located in each hopper 347A and 347B, are in communication with the gate or divider 354 to prevent excess cereal composition 312 from entering the mixers 350A and 350B. Use of a divider 354 in this manner, i.e., prior to adding wet ingredients, is accomplished more easily and efficiently, as compared with the dividers described in FIGS. 5A and 6A.

In one embodiment, the cereal composition 312 is first dumped onto one or more secondary conveyors prior to entering the mixers 350A and 350B, such as cleated inclined belt conveyors. If desired, raisins can be added at any point in the process. In one embodiment, (not shown) raisins are first passed through a "delumper" prior to being passed through a hopper onto a feeder and then onto the same secondary conveyor as the cereal composition.

The binder 238 can be added in any suitable manner to the mixer 316. In the embodiment shown in FIG. 3A, the binder 238 is pumped out of the binder use kettle 241 (shown in FIG.

2B) with first and second binder pumps, 351A and 351B, respectively, into first and second binder application manifolds 349A and 349B, respectively. Any suitable types of pumps 351A and 351B can be used that can maintain product viscosity and provide consistent flow, such as any type of positive displacement pump. In one embodiment a "Waukesha" pump is used. Conventional flow meters (not shown) can also be used to control the flow rate of the binder 238 into the manifolds, i.e., "piccolo" tubes 349A and 349B. The tubes or manifolds 349A and 349B are stainless steel tubes that are sealed on one end. Such tubes are typically about 2.5 cm to 7.6 cm (about one (1) to three (3) in) in diameter. Any suitable number of rows of holes can be present in each tube 349A and 349B, such as about one to three rows of holes drilled at regular intervals along the length of the tube. The diameter of each hole can vary from about 0.025 to 0.95 cm (about 0.01 to 0.375 in). The holes are spaced such that there are typically about twenty holes in a tube that is about 46 cm (about 18 in) in length, up to about 60 holes in a tube, which is about 0.9 m (about three (3) ft) in length.

The cereal composition 312 and binder 238 are combined in each mixer 350A and 350B for a suitable period of time. In some embodiments, other ingredients, such as dried fruit, reground material, particulates, clusters, and so forth, follow the same path to the mixers 350A and 350B in the same manner described above for the components of the cereal composition 312. Any suitable type of mixer can be used. In one embodiment, each mixer 350A and 350B is any type of cooker with an agitator. In another embodiment, the each mixer 350A and 350B is an inclined helical mixer. The inclined helical mixer is a U-shaped shell with a shaft running parallel to its long axis. The mixing is accomplished by the moving shaft, which has a steel ribbon in the shape of a helix. The shell itself is jacketed with water to allow temperature control in about the ten (10) to 91° C. (about 50 to 195° F.) range. In one embodiment, the operating temperature of each mixer 350A and 350B is about 21 to 54° C. (about 70 to 130° F.). In another embodiment, the operating temperature is kept at a constant temperature of about 54° C.

The temperature of the binder 238 decreases as it flows through each manifold 349A and 349B. In one embodiment, the binder 238 enters each manifold 349A and 349B at a temperature of about 54° C. (130° F.). In one embodiment, the binder 238 exits the manifold at a temperature of about 52° C. (about 125° F.). In another embodiment, the binder 238 has a temperature of about 49° C. (about 120° F.) as it combines with the cereal composition 312. At temperatures above about 54° C. (about 130° F.), the binder 238 can develop off-flavors due to protein degradation.

The binder 238 and cereal composition 312 are combined in a ratio of about 1:1 to produce first and second mixtures 352A and 352B, respectively, having a temperature of about 32 to 38° C. (about 90 to 100° F.). As noted above, prior to combining, the binder 238 can have a bulk density of about one (1) cp and the cereal composition can have a bulk density of about 0.3 g/cc, although the invention is not so limited. In this embodiment, the resulting mixtures 352A and 352B each have a bulk density of about 0.27 g/cc (about 4.47 cu in). In another embodiment, the mixtures 352A and 352B each have a bulk density of about 0.25 g/cc to 0.35 g/cc.

In an alternative embodiment, enrobers are used instead of the mixers 350A and 350B. In this embodiment, the cereal composition 312 is coated with the binder 238 in each enrober, and then processed in the same manner as discussed below.

The first and second mixtures 352A and 352B, respectively, move onto their respective first and second belts, 360 and 362 and into their respective spreaders 364 and 366 where they are essentially formed into "beds." Any suitable type of spreaders can be used. In one embodiment, deposition spreaders with reciprocating rakes are used. The portions 356, 358 are spread out to any suitable width and depth before passing through its respective picker wheel 368, 370, depending on the particular application. In one embodiment, each portion 356, 358 is spread out to about 97 to 101 cm (about 38 to 40 in) in width, and to about six (6) to 17.8 cm (about three (3) to seven (7) in) in depth, before passing through its respective picker wheel 368, 370. The picker wheels 368 and 370 serve to level the beds, i.e., the first and second mixtures, 352A and 352B, respectively, to produce a first leveled bed 371 and a second leveled bed 372. Each picker wheel 368, 370, has shafts with suitably arranged rows of tines that rotate counter to the direction of the flow of the first and second leveled beds 371, 372.

Each respective leveled bed, 371 and 372, then passes through a series of compression rolls or rollers, i.e., first compression rollers 373 and second compression rollers 374, to form a bottom layer 375 and top layer 376, respectively. Any suitable number of compression rollers can be used, such as one or two. In one embodiment, there are three to six or more compression rollers in each of the first and second series of compression rollers, 373 and 374.

Each leveled bed 371 and 372 can be compressed to any suitable dimension, dependent on the desired thickness of the cereal bar for a particular application. In one embodiment, the resulting bottom and top layers, 375 and 377, respectively, are compressed to about 0.64 to 1.3 cm (about 0.25 to 0.5 in). Following compression, the density of the cereal composition 312 is increased. In one embodiment, the bulk density of the cereal composition 312 after compression is about 1.5 to two (2) times the bulk density of the cereal composition 312 before compression. In an exemplary embodiment, the cereal composition 312 has a bulk density of about 0.25 to 0.35 g/cc before compression and a bulk density after compression of about 0.45 to 0.55 g/cc.

Referring now to FIG. 3B, the milk filling 114 (discussed in FIG. 2A) is passed through a filling pump 396, which can be any suitable type of pump, such as a positive displacement pump. At this point, the bottom layer 375 has cooled to a temperature of about 21 to 32° C. (about 70 to 90° F.). In order for the bottom layer 375 and layer of milk filling 114 to bond and form bonded layers 379 (and later, for the top layer 376 to bond adequately to the bonded layers 379), it is important that the temperature of the milk filling 114 be properly controlled as it is applied to the bottom layer 375. This can be accomplished through use of a filling heat exchanger 397, which can be any suitable type of heat exchanger, such as the Contherm® Swept Surface Heat Exchanger described above. In one embodiment, the filling heat exchanger 397 cools the milk filling 114 to about 130° F. or less.

Upon exiting the filling heat exchanger 397 the cooled filling is formed into a continuous sheet or layer of filling 114 on top of the bottom layer 375 as it flows through a filling applicator 377. In one embodiment, the filling applicator 377 is an extrusion head or sheeting nozzle. In another embodiment, the pump 396 feeds the filling applicator 377 with a vacuum assist in order to prevent air locks or bubbles in the filling 114. In one embodiment, the filling applicator 377 is capable of delivering the appropriate width of material, such as about 35 to 40 in, or 20%, by weight, of the final product. In a particular embodiment, a Vemag 500 Filling Applicator, made by Robert Reiser & Co., Inc. in Canton, Mass., is used.

The milk filling 114 is applied at a temperature of at least about 28 to 31° C. (about 82 to 88° F.). Below the melting point of the milk filling, which is about 29.4° C. (85° C.) in one embodiment, the viscosity of the milk filling 114 changes dramatically from about 10,000 to about 100,000 cp. Even after it cools, the milk filling 114 is still deformable, similar to the "soft ball" stage of candy. Controlling the temperature in this manner also controls the amount of filling, i.e., cooler temperatures deposit thicker, yet less filling while warmer temperature deposit a larger amount of a thinner filling. The lamination, i.e., softening, is observable when the appearance of the milk filling 114 changes from a matte finish to a glossy finish, i.e., just above the melting point or glass transition temperature of the fat in the filling. This change typically occurs at a temperature of about 31 to 35° C. (about 88 to 95° F.). Once lamination of the milk filling 114 occurs, the two layers are adequately bonded, thus forming the bonded layers 379.

In another embodiment, the milk filling 114 is not chilled prior to being applied to the bottom layer 375. In yet another embodiment, the temperature of the bottom layer 375 is adjusted higher or lower, as needed, in order to facilitate application of the milk filling 114. In one embodiment, a conventional chilled roller (not shown) is used to apply the milk filling 114. Chilling the milk filling 114 in this way may also aid in applying it to the bottom layer 375.

The top layer 376 is transported via a lowering conveyor 380 to the top of the layer of milk filling 114. Due to the previous heating of the milk filling 114, as described above, the top layer 376 can now also adequately bonded to the layer of milk filling 114. The resulting combined layers 381 pass through one or more polishing rollers 382 to form a layered stream 383, i.e., pressed layers. The polishing roller 382 provides relatively light compression so that the layers bond properly. In one embodiment, about 2.3 to 4.5 kg (about five (5) to ten (10) lbs) of pressure is applied to the layers (i.e., the bonded layers 379 and the top layer 376), comparable to the pressure used with a home rolling pin. The compression causes the layers to compress about 0.16 cm (about 0.06 in) to about 2.2 cm (about 0.88 in) in total height, thus setting the final height. Essentially, the polishing roller 382 removes most of the surface irregularities that may exist from transfer of the top layer to the bottom layer. The layered stream 383 can be any suitable width depending on the equipment being used. In one embodiment, the layered stream 383 is about 89 to 114 cm (about 35 to 45 in) wide. In a particular embodiment, the layered stream 383 is about 99 cm (about 39 in) wide.

At this point, the layered stream 383 passes through a first cooler or cooling tunnel 384, which is maintained at a temperature of about 10 to 15.6° C. (about 50 to 60° F.). The layered stream 383 cools from about 32 to 12.7° C. (about 90 to 55° F.) in the first cooler 384. The layered stream 383 then passes through a slitter 385 where it is slit or cut into individual pieces to form layered ribbons 386. Any suitable type of slitter 385 can be used. In one embodiment, the slitter 385 is comprised of any number of rotating blades, such as about 30 or more rotating blades. The layered stream 383 can be cut into any suitable number of strips. In one embodiment, the layered stream 383 is cut into about 30 to 40 strips that can be any suitable width, such as from about 1.9 to 5.7 cm (about 0.75 to two (2) in). In a particular embodiment, the layered stream 383 is cut into strips that are about 3.8 cm (about 1.5 in) wide.

The trim pieces 387 produced by the slitter 385 along the outside edges of the layered stream 383 are either used as recycled material 388 or scrapped as waste 389. In one embodiment, about 30 to 90% of the trim pieces 387 are saved as recycled material 388. The exact proportion of recycled material 388 to waste 389 depends on how various addition rates affect the final product, as the recycled material 388 does contain some milk filling 114. In most cases, the recycled material 388 is returned to one or both of the mixers ("A" and/or "B") 350A and/or 350B where it is combined with the other ingredients. In one embodiment, the first and second mixtures (352A and 352B in FIG. 3A) each comprise about zero (0) to five (5) % trim 386. In most embodiments, the recycle rate into each mixer 350A and 350B is about the same.

The layered ribbons 386 then pass through a cutter 390 which cuts the layered ribbons 386 into highly dense individually-sized layered cereal bars 391 weighing about 40 to 50 g. Any suitable cutter 390 can be used. In one embodiment a reciprocating guillotine cutter is used. The cutter 390 can operate at any suitable speed. In one embodiment, the cutter 390 completes about 30 cycles per minute, i.e. makes one cut about every two (2) seconds. After being cut, the individual layered cereal bars 391 are separated in a separator 392. In one embodiment, the separator is a conveyor belt that runs slightly faster than the belt under the cutter 390. As the cereal bars 391 make the transfer to the faster conveyor belt, they separate slightly along the axis of travel.

The individually sized layered cereal bars 391 pass through a second cooler or cooling tunnel 393 that operates at about 10 to 12.7° C. (about 50 to 55° F.). The temperature of the cereal bars 391 is reduced from about 12.7 to 10° C. (about 55 to 50° F.) in the second cooler 393. In the embodiment shown in FIG. 3B, the bars can optionally pass through a cinnamon duster 398 where a cinnamon mixture 399 is applied prior to entering a separator 392. In one embodiment, the cinnamon mixture 399 is comprised of a mixture of about five (5) %-ten (10) % cinnamon, 90-95% sugars, and a small amount, such as about 0.025%, of flow agent as a process aid. In one embodiment, the flow agent is silicon dioxide available from any commercial source, such as McCormick-Schilling Co. The sugars can be comprised of a mixture of sugar and fructose ranging from about 50% to 50% up to about 80% to 20%, respectively. The cinnamon duster 398 can be any suitable type of flour sifter, such as a flour sifter made by Spray Dynamics, Inc.

After passing through the separator 392, the cereal bars 391 can then travel along a conveyor belt to a packager 394 where they are individually wrapped. In one embodiment, a surger or conveyor belt (not shown) is located prior to the packager 394 so that the cereal bars 391 can accumulate if the packager is temporarily not operating for any reason (See, e.g., FIG. 6B). The resulting individually wrapped layered cereal bars 395 can then be packaged in a secondary carton in any suitable quantity. In one embodiment, six (6) individually wrapped cereal bars 395 are packed in a container. The product is then distributed in any manner known in the art, such as in any food service facility (e.g., grocery store, restaurant, movie theatre, airport, hospital, school, and further including any location where food is sold), vending machine, by mail order, including over the Internet, and so forth.

Regarding apparatus used in the cereal bar process discussed in FIGS. 3A and 3B, any conventional devices known in the art can be used. For example, with regard to the compression rollers 373 and 374 discussed in FIG. 3A, any known rollers used in conventional milling processes can be used. In another embodiment, one or more compression rollers 373 and 374 are used to gradually compress the first and second leveled beds, 371 and 372, rather than compressing the beds in one step. In this way, fewer whole cereal pieces are crushed and/or broken. In a particular embodiment three (3) "ganged"

or "grouped" compression rollers are each set at an incline to gradually reduce the thickness of the layer, such that there are six (6) compression steps.

These compression rollers 373 and 374 rotate in the same direction as the conveyor belt below on which the first and second leveled beds, 371 and 372, respectively, are traveling. In some instances, this may be the same conveyor belt on which the product has been traveling since exiting the divider 354, or there may actually be a series of conveyor belts onto which the product is transferred during manufacturing, depending on the particular operation.

Figure 4:
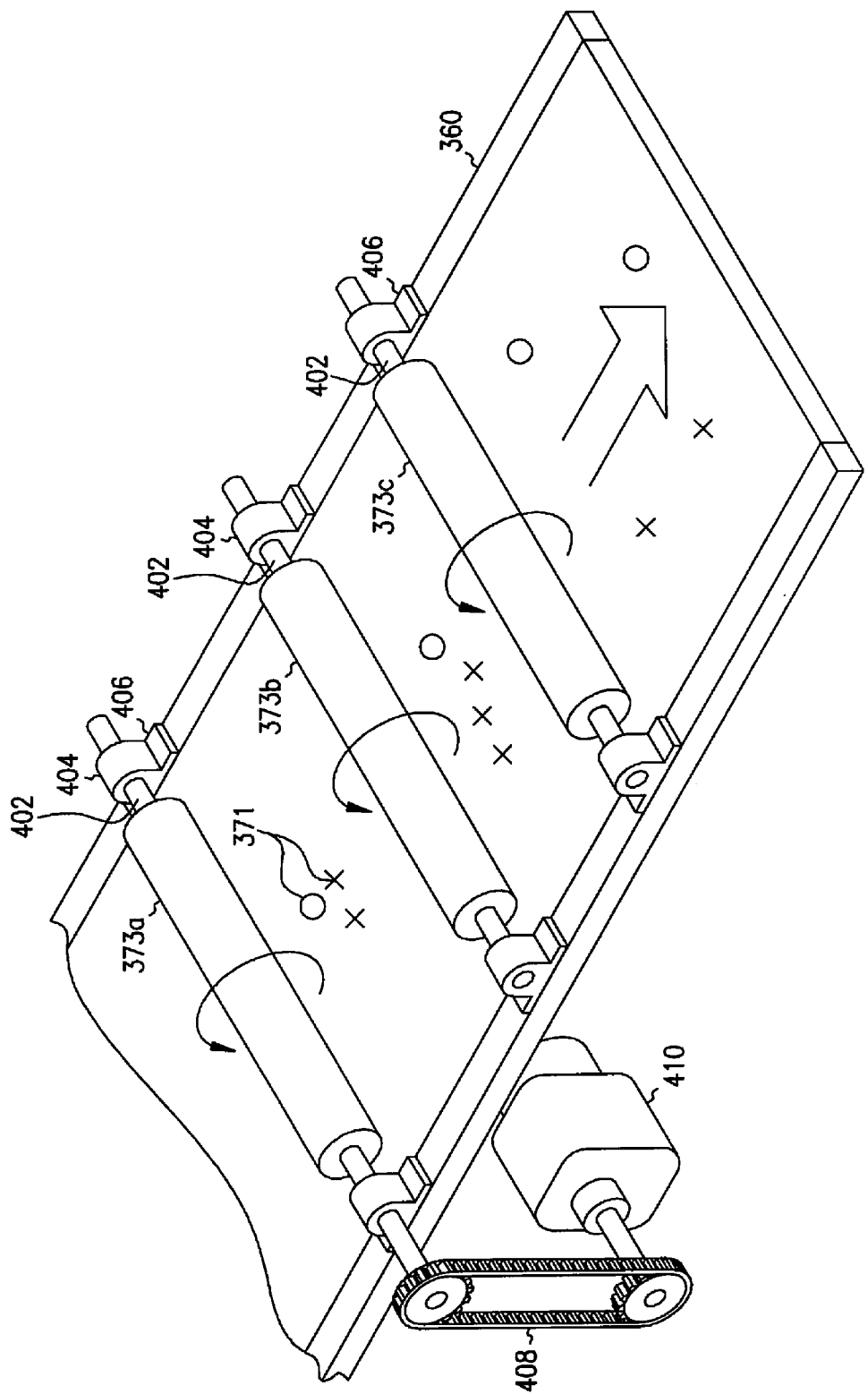
FIG. 4 is a simplified drawing of a series of compression rollers used in the embodiment described in FIGS. 3A and 3B.

In the embodiment shown in FIG. 4, it is assumed that the first leveled bed 371 is still on the first belt 360 (See FIG. 3A). As FIG. 4 shows, the first compression rollers 373 can be comprised of three rollers 373a, 373b and 373c, although the invention is not so limited. Any suitable number of rollers, up to about six or more can be used in series. Although the rollers 373a, 373b and 373c travel in the same direction as the first belt 360, they are designed to rotate about 10 to 40% faster, up to about 80% faster than the forward speed of the first belt 360. In a particular embodiment, the rollers 373a, 373b and 373c travel at about 1.8 to 3.7 m (about six (6) to 12 ft/min), but maintain a speed of at least about 0.6 m/min (about two (2) ft/min) faster than the first belt 360.

The rollers 373a, 373b, 373c in FIG. 4 are not wrapped in any type of belt, as with conventional rollers. Operating the rollers without a belt and at a slightly higher speed than the product below helps to keep the rollers cleaner than conventional compression rollers. The rollers, in essence, operate much like the rollers or track on a military tank, albeit, without the belts. Further, by drawing the product, i.e., the first leveled bed 371 through on two planes (i.e., on the first conveyor belt 360 below and the rollers 373a, 373b and 373c above), the surface of the product is more polished, and has a smoother appearance. This roller arrangement also improves compression of the product while reducing breakage of individual cereal pieces. In one embodiment plastic rollers are used. In another embodiment, ultra high molecular weight (UHMW) polyethylene rollers are used. The rollers can each be of any suitable dimensions, depending on the particular operation, and can each have varying diameters, if desired. In one embodiment, the rollers have a diameter of about ten (10) to 20.3 cm (about four (4) to eight (8) in) and are about 25 to 152 cm (about ten (1) to 60 in) in length, depending on the particular application. In one embodiment, any suitable height adjusting mechanism is connected to each of the rollers 373a, 373b and 373c, so that the height of each roller can be adjusted accordingly. In this way, beds of varying heights can be accommodated and/or the final product can be designed to have a higher or lower density, as desired.

As FIG. 4 shows, each roller 373a, 373b and 373c has a central shaft 402 that can be of any suitable dimensions. Suitable bearings 404 and mounting plates 406 are located on the ends of each roller 373a, 373b and 373c, as is known in the art. All of the rollers 373a, 373b and 373c are connected to suitable drive mechanisms known in the art, although for simplicity, only the first roller 373a is shown in limited detail. A conventional drive chain 408 is attached to one end of the central shaft 402. The drive chain is powered by a suitably sized motor 410, such as a variable speed drive motor. The motor 410 is connected to the drive chain 408 as shown in FIG. 4.

Figure 5A:
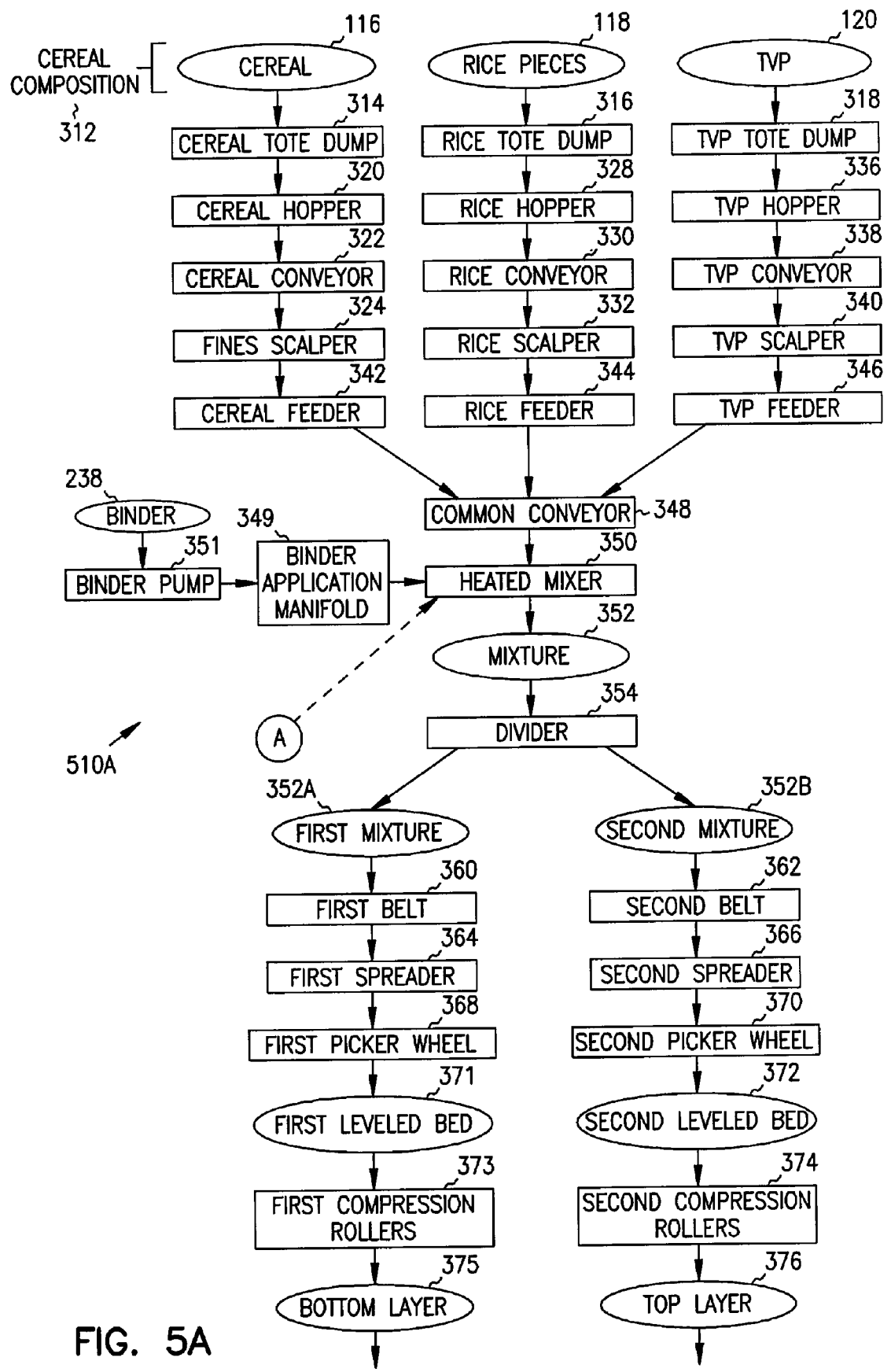
FIG. 5A is a simplified flow diagram of a first part of a first alternative process for making a layered cereal bar in one embodiment of the present invention.
Figure 5B:
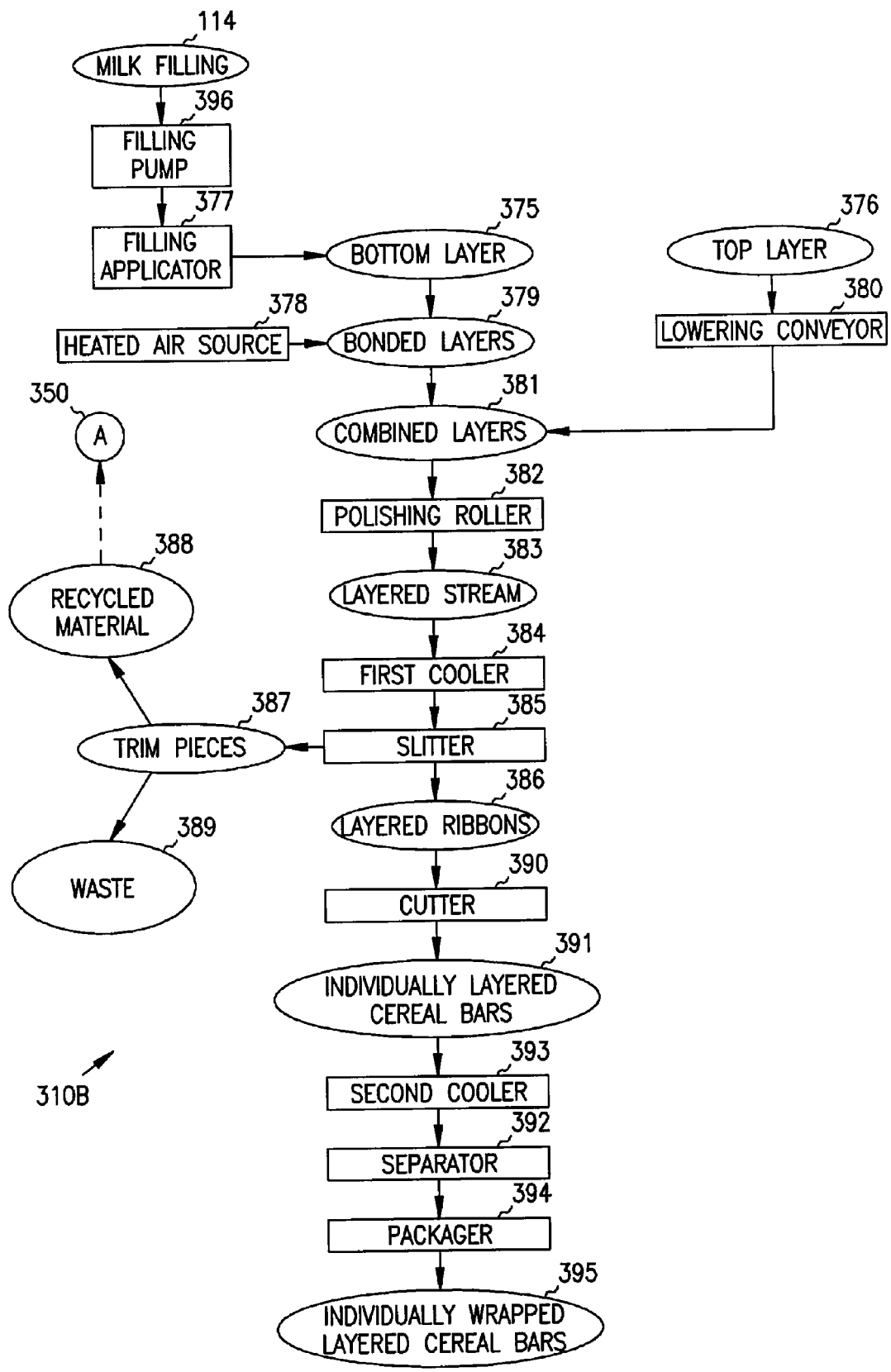
FIG. 5B is a simplified flow diagram of a second part of the process described in FIG. 5A for making the layered cereal bar.

FIGS. 5A and 5B show an alternative method for making layered cereal bars 395. This method is similar to the method shown in FIGS. 3A and 3B in many respects. However, in this embodiment the filling heat exchanger 397 is replaced with a heated air source 378, such as a heat gun or air curtain. The heated air source 378 operates at a temperature of between about 27 to 31° C. (about 80 to 85° F.). Using the heated air source 378 from on top of the layer of milk filling 114 as it passes by, causes it to become laminated or bonded with the bottom layer 375. Depending on the travel speed of the conveyor belt on which the milk filling 114 is located, the heated air source 378 is applied for only one (1) to three (3) seconds or more. The lamination, i.e., softening, is observable when the appearance of the milk filling 114 changes from a matte finish to a glossy finish. This change typically occurs at a temperature of about 31 to 35° C. (about 88 to 95° F.). Once lamination of the milk filling 114 occurs, the two layers are adequately bonded, thus forming the bonded layers 379, as described above.

This embodiment also differs in that there is only one heated mixer 350. The components enter the heated mixer 350 directly from the common conveyor 348 to form a mixture 352, which is then divided with an alternate divider 554 into first and second mixtures, 352A and 352B, respectively. Any suitable type of divider 554 can be used. In one embodiment, a twin helix wet stream divider, which is a symmetrical hopper with two helical screws, is used. In this embodiment, the mixture 352 floods the helixes and is divided by differential screw speed.

Additionally, since there is only one mixer 350, there is need for only one pump 351 and one binder application manifold 349 to supply binder 238 to the mixer 350. In this embodiment, no cinnamon mixture 399 is being added, although the invention is not so limited.

Figure 6A:
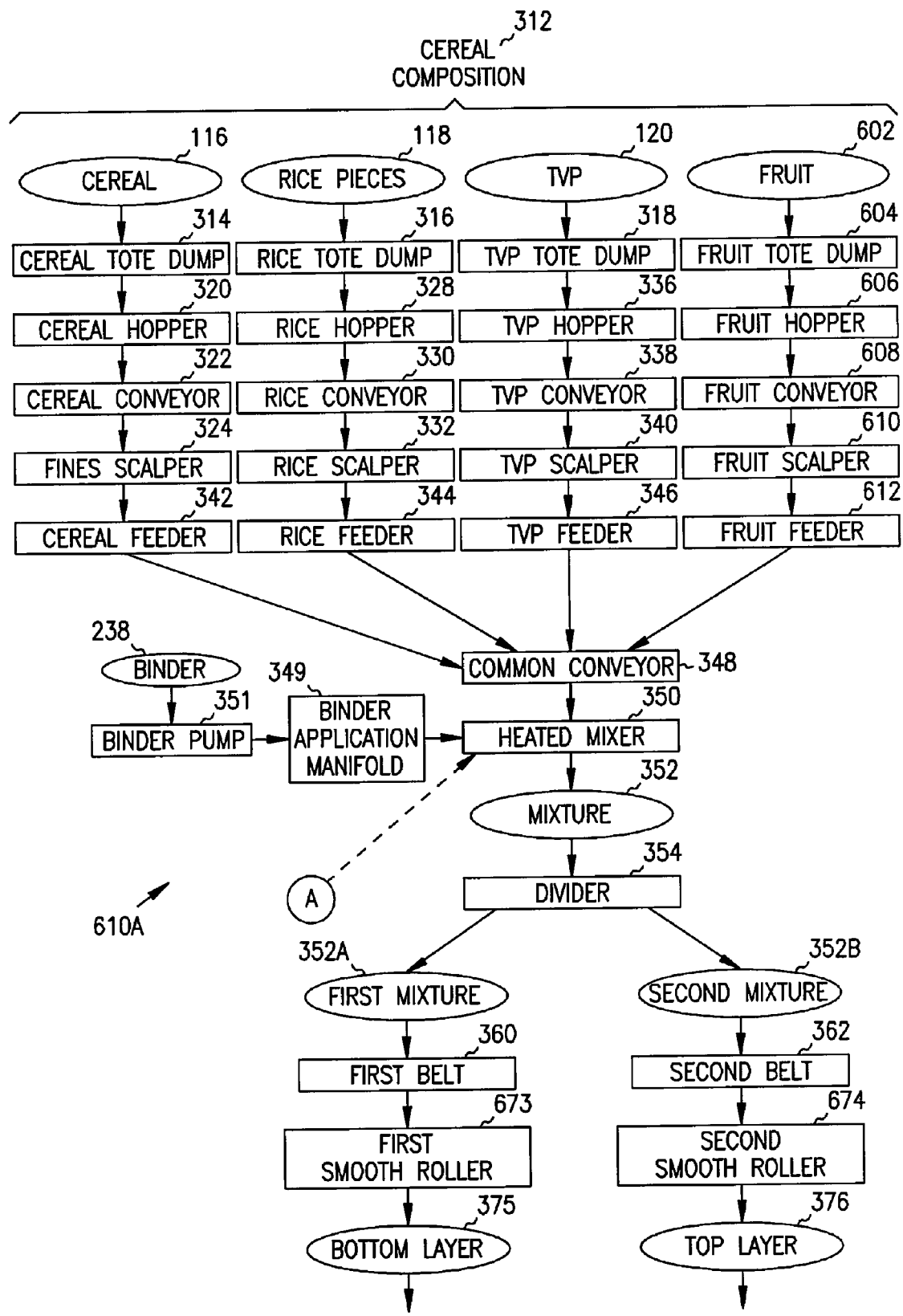
FIG. 6A is a simplified flow diagram of a first part of a second alternative process for making a layered cereal bar in one embodiment of the present invention.
Figure 6B:
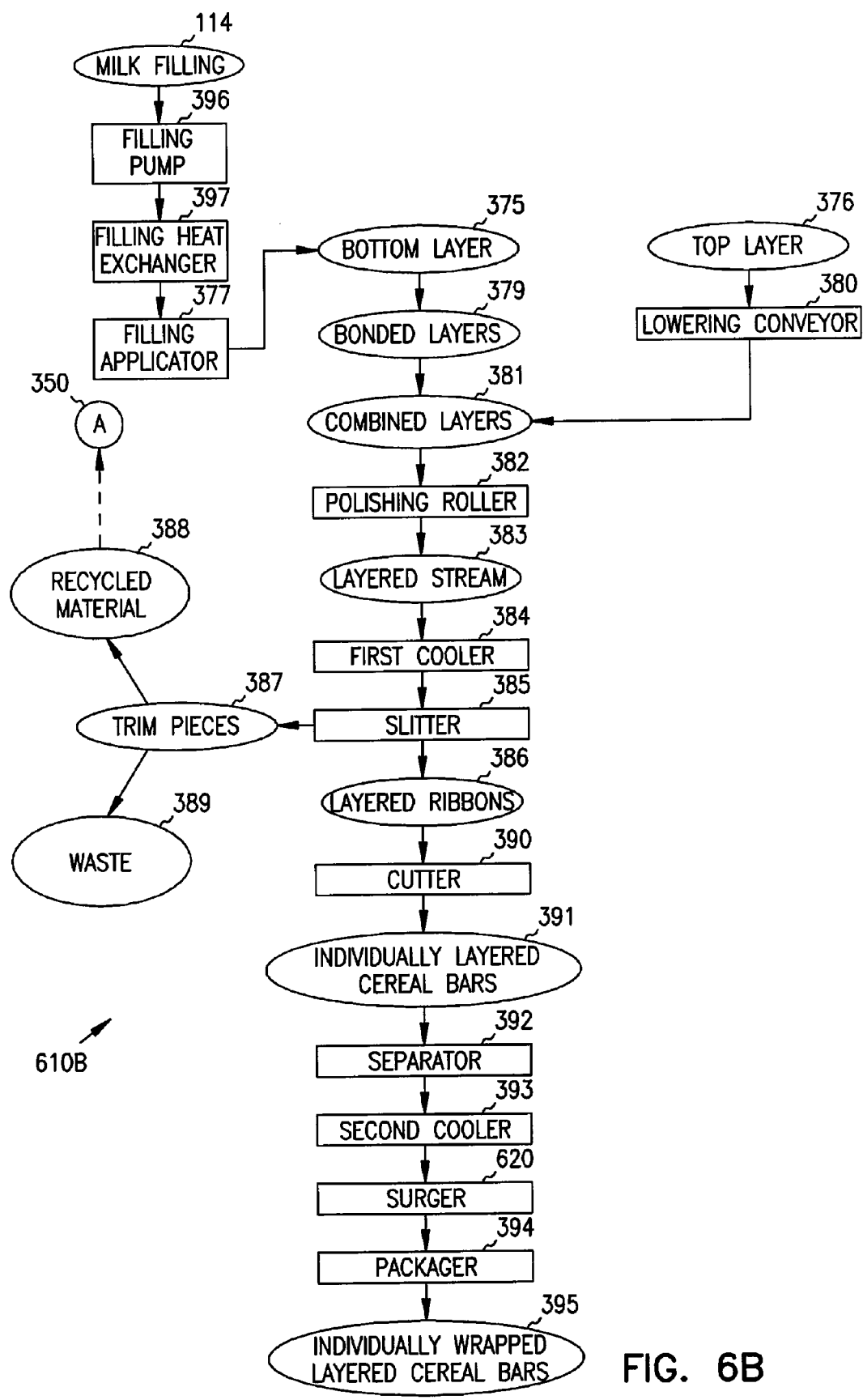
FIG. 6B is a simplified flow diagram of a second part of the process described in FIG. 6A for making the layered cereal bar.

FIGS. 6A and 6B show another alternate method for making layered cereal bars 395. Fruit 602, such as dried fruit, which is also shown as a component in the cereal composition 312, can also be used in any of the aforementioned embodiments, together with any other suitable additives and/or particulates, clusters, and so forth. As shown in FIG. 6A, the fruit 602 passes through a fruit tote dump 604, fruit hopper 606, fruit conveyor 608, fruit scalper 610 and fruit feeder 612 prior to entering the common conveyor 348, in the same manner as the other components, i.e., cereal 116, rice pieces 118 and TVP 120.

In this embodiment, an alternate divider 654 is used to divide the mixture 352 into two portions, namely 352A and 352B. The alternate divider 654 is comprised of a suitably-sized inverted stationery sheet metal piece placed approximately in the center of the discharge stream of the mixer 350, i.e., the mixture 352, as it is traveling along a suitable conveyor belt. Essentially, the alternate divider 654 relies on the stable discharge flow from the mixer 350 to divide the stream. The alternate divider 654 can be adjusted as to location at any suitable time. In one embodiment, the alternate divider 654 is adjusted at start-up to be in the geometric center of the flow, thereby dividing the stream, i.e., mixture 352, into approximately two equal parts. In one embodiment, the alternate divider 654 is u-shaped.

The resulting first and second portions or mixtures, 352A and 352B, respectively, travel along their respective conveyors or belts to first and second smooth rollers, 673 and 674, respectively. In one embodiment, each smooth roller is comparable to the rollers used in an old-fashioned ringer-type washing machine. The smooth rollers, 673 and 674, serve to compress and form each portion into a relatively uniform sheet or layer, i.e., the bottom layer 375 and top layer 376, respectively. The smooth rollers, 673 and 674, essentially take the place of the spreaders, picker wheels and compression wheels used in the previous embodiments. Using additional rolls (or formers) in each smooth roller provides added control in compressing and forming the mixture 352. In one embodiment, each smooth roller is a three-roll smooth roll extruder. In another embodiment, the smooth rollers, 673 and 674, have four to six or more rollers. The bottom and top layers, 375 and 376, can also be characterized as "endless-mass" slabs having essentially infinitely variable thicknesses.

In one embodiment, there are temperature controls on the smooth rollers 673 and 674. In another embodiment, there are also temperature controls on the actual surface, such as a plate or shoot, on which the resulting bottom and top layers 375 and 376 emerge. In one embodiment, a jacketed hopper of an appropriate width is used to cool the resulting layers. In a particular embodiment, Bepex Smooth Roller Formers (Type GP) made by Hosokawa Bepex GmbH in Leingarten, Germany are used. The layers 375 and 376 may have improved product identity over previously described methods, such that there are an increased number of whole cereal pieces 116. In one embodiment, there are about one (1) to ten (10) % or more whole cereal pieces 116. In another embodiment, there are over ten (10) %, up to about 25% or more whole cereal pieces 116 as compared with the previously described methods that uses compression rollers, 373 and 374, in combination with the spreaders and picker wheels. However, this process appears to have higher operating costs, at least initially.

In another embodiment, a height adjuster is also used or is already a part of the unit itself, such as with the Bepex model described above. The rollers are also able to make a fairly "defined" edge, which reduces the amount of trim 387 (shown in FIG. 6B), thus reducing waste and saving on manufacturing costs. The resulting top and bottom layers 375 and 376 further have a more consistent appearance and use of the rollers 673 and 674 further provide for improved weight control of the final product, i.e., the individually wrapped layered cereal bars 395.

The resulting bonded layers 379 are then fed through the second smooth roller 674, together with the top layer 376, as described above, to form combined layers 381. The remaining steps in the process are similar to those described in FIG. 3B. Essentially, the combined layers 381 are passed under a polishing roller 382, first cooling tunnel 384, slitter 385, cutter 390 and separator 392, prior to entering a second cooling tunnel 393 and packager 394. In another embodiment, the layered cereal bars 391 travel through the second cooler 393 prior to entering the separator 392. As show in FIG. 6B, there can also be a surger 620 to collect accumulating cereal bars, should the packaging unit 394 stop for any reason. The width and thickness of the layers 375 and 376, as well as the bonded layers 379, combined layers 381, and individually layered cereal bars 391 are the same as what was described in reference to FIGS. 3A and 3B above.

Any of the aforementioned commercial devices can include a system controller. The system controller can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. The non volatile memory may comprise a disk drive or read only memory device which stores a program to implement the above control and store appropriate values for comparison with the process variables as is well known in the art. Such sensing devices may include, but are not limited to, devices for sensing temperatures, pressures and fluid flow rates, and transducing the same into proportional electrical signals for transmission to readout or control devices may be provided for in all of the principal fluid flow lines. Furthermore, means for sensing temperature, pressure and fluid flow rates in all of the fluid flow lines may also be accomplished by suitable manual means.

It will be understood by those skilled in the art that the apparatus for manufacturing the layered cereal bars includes all known apparatus for moving components into, through and out of a food processing system. This includes, but is not limited to, various types of pumps, filters, strainers (such as magnetic strainers, decline dual strainers, etc.), flow meters, heat exchangers (such as plate type swept surface heat exchangers), drains, level indicators, grate magnets, and so forth. (A grate magnet is essentially a series of parallel magnetic bars placed in an ingredient or product stream to remove magnetic metal particles from the stream as a consumer protection measure). Further, although in many instances only the term "kettle" has been used herein, it is to be understood that in some embodiments there are separate kettles for mixing versus holding, i.e., using.

It will further be understood by those skilled in the art that all of the lines in the system are made from materials that can be either flexible or rigid, depending on their location and use. Furthermore, all lines are of a suitable diameter for their intended purpose, but are preferably between about 1.3 cm (0.5 in) and about ten (10) cm (four (4) in) in diameter. It will also be appreciated by those skilled in the art that flexible lines can include hoses made from rubber, plastic or other suitable material, and rigid lines can be made from galvanized metal, stainless steel, copper, PVC or other suitable material.

Conclusion

The layered cereal bar described herein essentially provides the nutrition of a bowl of cereal and milk in portable form. Each bar is conveniently sized and individually packaged. Further, the layered cereal bar is larger than conventional food bars. As a result the consumer can now enjoy the nutritional and organoleptic benefits of cereal and milk essentially anywhere, at any time. Unlike some conventional cereal bars, the layered cereal bars of the present invention are not baked, but are non-cooked cereal bars formed from pieces of identifiable cereal pressed together with other components. As such, the cereal bars of the present invention do not contain leavening. The cereal bars are crunchy, yet chewy, producing few crumbs without being excessively sticky. It has the further advantage of having a unique and appealing appearance. Specifically, the RTE cereal is clearly identifiable and in one embodiment, there is a clearly defined creamy milk layer.

What is claimed is:

1. A cereal bar comprising:
    a non-cooked cereal bar containing inulin and having a total calcium, vitamin, mineral and protein level equal to or greater than the calcium, vitamin, mineral and protein level of a single serving of ready-to-eat cereal and milk, and a protein content of about six (6) g, the non-cooked cereal bar made from two cereal layers comprised of a cereal composition made from identifiable ready-to-eat (RTE) cereal pieces, the cereal pieces combined with rice, a protein source and a carbohydrate binder, wherein at least one of the cereal pieces is a whole cereal piece, the rice is a quantity of high-protein rice pieces having a protein content of at least about 50%, and the protein source is texturized vegetable protein having a protein content of at least about 50%; and
    a visible milk filling layer having a variable thickness and comprised of milk powder, sweeteners and fat, wherein the visible milk filling layer is located in between and bonded to each of the two cereal layers.

2. The cereal bar of claim 1 having a total fiber percentage of about 5 to 10%.

3. The cereal bar of claim 1 wherein the visible milk filling layer comprises about 20%, by weight, of the cereal bar.

4. The cereal bar of claim 1 wherein the milk powder, sweeteners and fat are combined in a ratio of about 1:2:1.4.

5. The cereal bar of claim 1 wherein the sweeteners are carbohydrate sweeteners selected from lactose, sucrose, dextrose, fructose, corn syrup, corn syrup solids, and maltodextrins, further wherein the fat is hydrogenated vegetable oil.

6. The cereal bar of claim 1 wherein the cereal, rice and protein source are combined in a ratio of about 2:1:1.

7. The cereal bar of claim 1 wherein the binder further comprises ingredients selected from soy proteins, vitamin and mineral macronutrients, flavorings, and colorings.

8. The cereal bar of claim 7 wherein the mineral macronutrients include calcium.

9. The cereal bar of claim 8 wherein the calcium is tricalcium phosphate.

10. The cereal bar of claim 1 wherein the ready-to-eat (RTE) cereal is comprised of puffed cereal pieces selected from flakes, shreds, biscuits, rings, spheres, squares, rounds, triangles, hexagonals, tubes, oblongs, and combinations thereof.

11. The cereal bar of claim 1 wherein the cereal bar has a water activity of between about 0.35 and 0.55.

12. The cereal bar of claim 11 wherein the cereal bar has a water activity of between about 0.4 and 0.5, the binder has a water activity of between about 0.45 and 0.6, and the filling layer has a water activity of between about 0.25 and 0.35.

13. The cereal bar of claim 1 wherein the visible filling layer is a compound coating.

14. The cereal bar of claim 1 wherein the cereal bar further comprises a topping layer.

15. The cereal bar of claim 14 wherein the topping layer is a frosting or glaze.

16. The cereal bar of claim 14 wherein the topping layer is comprised of dry or powdered ingredients.

17. The cereal bar of claim 15 wherein the topping layer is a frosting or glaze in combination with dry or powdered ingredients.

18. The cereal bar of claim 1 wherein the cereal bar is partially or totally enrobed in a coating.

19. The cereal bar of claim 18 wherein the coating is comprised of dry or powdered ingredients.

20. A cereal bar comprising:
a non-cooked cereal bar containing inulin and having a total calcium, vitamin, mineral and protein level equal to or greater than the calcium, vitamin, mineral and protein level of a single serving of ready-to-eat cereal and milk, and a protein content of about six (6) g, the non-cooked cereal bar made from at least two cereal layers comprised of a cereal composition made from identifiable ready-to-eat (RTE) cereal pieces, the cereal pieces combined with rice, a protein source and a carbohydrate binder, wherein at least one of the cereal pieces is a whole cereal piece, the rice is a quantity of high-protein rice pieces having a protein content of at least about 50%, the protein source is texturized vegetable protein having a protein content of at least about 50% and the carbohydrate binder is a carbohydrate-gelatin binder comprised of fat, syrups, glycerins, sugars, gelatin and water wherein the gelatin and water is combined in a ratio of about 4:1 to form hydrated gelatin, the hydrated gelatin having a substantially translucent appearance in the cereal bar; and
at least one visible filling layer located in between and bonded to each of the at least two cereal layers.

21. The cereal bar of claim 20 having a total fiber percentage of about 5 to 10%.

22. The cereal bar of claim 20 wherein the high-protein rice pieces comprise about 7.5 to 12%, by weight, of the final product.

23. The cereal bar of claim 20 wherein the high protein rice pieces are extruded rice pieces about two (2) to eight (8) mm in diameter, with a density ranging from about 10.7 to 29 g/100 cc.

24. The cereal bar of claim 23 wherein the extruded rice pieces have a density of about 18 to 23 g/100 cc.

25. The cereal bar of claim 20 wherein the at least one visible filling layer is a creamy or chunky layer selected from the group consisting of peanut butter, chocolate, frosting, honey, yoghurt, fruit filling and any combination thereof.

26. The cereal bar of claim 20 wherein the at least one visible filling layer further includes a food or food combination selected from cereal, cereal pieces, granola pieces, nuggets, nuts, nut pieces, marshmallows, marbits, candies, candy pieces, cookies, cookie pieces, chocolates, chocolate products, edible particulates, dried whole fruits, fruit parts, dried fruit products, fruit products, and combinations hereof.

27. A method of making a non-cooked cereal bar comprising:
providing two cereal layers having a cereal composition made from identifiable ready-to-eat (RTE) cereal pieces;
combining the two cereal layers with rice, a protein source and a carbohydrate binder, wherein at least one of the cereal pieces is a whole cereal piece, the rice is a quantity of high-protein rice pieces having a protein content of at least about 50%, and the protein source is texturized vegetable protein having a protein content of at least about 50%, wherein the cereal bar is a non-cooked cereal bar containing inulin and having a total calcium, vitamin, mineral and protein level equal to or greater than the calcium, vitamin, mineral and protein level of a single serving of ready-to-eat cereal and milk, and a protein content of about six (6) g;
adding a visible milk-based filling layer having a variable thickness in between each of the two cereal layers, wherein the visible milk filling layer is comprised of milk powder, sweeteners and fat; and
bonding the visible milk-based filling layer to each of the two cereal layers.

28. The method of claim 27 wherein the cereal bar has a total fiber percentage of about 5 to 10%.

29. The method of claim 28 wherein the binder contains less than 30% by weight of fat.

30. The method of claim 28 wherein the identifiable cereal pieces are made from a grain-based dough.

31. A product made according to the method of claim 27.

32. A method for making cereal bars, comprising:
mixing a carbohydrate-gelatin binder containing less than 30% by weight of fat with a cereal composition having identifiable cereal pieces to form an amorphous mass, the carbohydrate-gelatin binder produced by a batch binder process comprising:
combining soy protein and fat to form a slurry;
mixing the slurry with a heated sugar solution containing inulin and with substantially translucent hydrated gelatin, the heated sugar solution containing syrups, glycerin and sugar;
compressing the amorphous mass into a first layer and a second layer, each layer having identifiable cereal pieces and a bulk density about 1.5 to 2 times higher than the amorphous mass;

applying a filling layer on the first layer at a temperature sufficient to bond the filling layer to the first layer wherein the filling layer is a visible milk filling layer having a water activity of between about 0.25 and 0.35, the filling layer made by combining milk powder, sweeteners and fat;

combining the first layer and filling layer with the second layer at a temperature sufficient to bond the second layer to the filling layer; and pressing the first layer, filling layer and second layer together to form pressed layers, wherein the pressed layers are cut into individual cereal bars having identifiable cereal pieces, each cereal bar having a total nutrient level equal to or greater than the nutrient level of a single serving of ready-to-eat cereal and milk.

33. The method of claim 32 wherein the cereal bar has a total fiber percentage of about 5 to 10%.

34. The method of claim 32 further comprising placing the cereal composition into two separate mixers prior to adding the binder, wherein addition of the binder to the separate mixers produces a first amorphous mass and a second amorphous mass, wherein the first amorphous mass is spread into a first layer and the second amorphous mass is spread into a second layer prior to the compressing step, further wherein each amorphous mass has a bulk density of about 0.3 g/cc and each layer has a bulk density of about 0.5 g/cc.

35. The method of claim 34 further comprising bonding the filling layer and the first layer together prior to the pressing step until the filling layer is laminated.

36. The method of claim 35 further comprising:
cooling the pressed layers;
cutting the pressed layers axially and longitudinally into individual layered cereal bars;
cooling the individual layered cereal bars; and
packaging the individual layered cereal bars.

37. A product made according to the method of claim 32.

* * * * *